(12) United States Patent
Scott-Collins et al.

(10) Patent No.: US 12,539,811 B2
(45) Date of Patent: Feb. 3, 2026

(54) 2K DOOR GASKET, REAR VIEW DEVICE, VEHICLE AND ASSEMBLING AND ATTACHMENT METHOD

(71) Applicant: MOTHERSON INNOVATIONS COMPANY LIMITED, London (GB)

(72) Inventors: Callum Scott-Collins, Portchester (GB); Jakub Spychala, Portchester (GB); Kane Connor, Portchester (GB); Graham Rehill, Portchester (GB)

(73) Assignee: Motherson Innovations Company Limited, London (GB)

( * ) Notice: Subject to any disclaimer, the term of this patent is extended or adjusted under 35 U.S.C. 154(b) by 543 days.

(21) Appl. No.: 17/685,203

(22) Filed: Mar. 2, 2022

(65) Prior Publication Data
US 2022/0305993 A1 Sep. 29, 2022

(30) Foreign Application Priority Data
Mar. 25, 2021 (DE) ...................... 10 2021 107 588.2

(51) Int. Cl.
*B60R 1/06* (2006.01)
*B60R 11/04* (2006.01)
*B60J 10/76* (2016.01)
*B60R 11/00* (2006.01)

(52) U.S. Cl.
CPC ............... *B60R 1/06* (2013.01); *B60R 11/04* (2013.01); *B60J 10/76* (2016.02); *B60R 2011/004* (2013.01); *B60R 2011/008* (2013.01)

(58) Field of Classification Search
CPC ..... B60R 1/06; B60R 11/04; B60R 2011/004; B60R 2011/008; B60J 10/76; B60J 5/0404
USPC ....................................................... 359/514
See application file for complete search history.

(56) References Cited

U.S. PATENT DOCUMENTS

| | | | |
|---|---|---|---|
| 2009/0071077 A1* | 3/2009 | Takase | B60J 10/277 49/489.1 |
| 2010/0110553 A1* | 5/2010 | Anderson | G02F 1/157 359/603 |

(Continued)

FOREIGN PATENT DOCUMENTS

| DE | 1102007041134 A | 4/2008 |
|---|---|---|
| FR | 2711594 A1 | 5/1995 |

(Continued)

OTHER PUBLICATIONS

Machine translation of the Car Door Rearview Mirror; Nishimura (CN 104411545) (Year: 2015).*

(Continued)

*Primary Examiner* — Wyatt A Stoffa
*Assistant Examiner* — Rahman Abdur
(74) *Attorney, Agent, or Firm* — Jones Day

(57) ABSTRACT

The present disclosure refers to a sealing means adapted to be installed between a base assembly of an exterior rear view device and a door panel of a door of a vehicle, wherein the sealing means is provided in form of a 2K door gasket with a door gasket seal and a door gasket substrate for a 2-way simultaneous sealing comprising an inner sealing to the base frame and an outer sealing to a cover of the base frame, in particular a lower base cover, and/or to the door panel. It also refers to a rear view device with such a sealing means, a vehicle with such a rear view device and a method for assembling the exterior rear view device and attaching the same to the vehicle by using the sealing means.

17 Claims, 17 Drawing Sheets

(56) References Cited

U.S. PATENT DOCUMENTS

| | | |
|---|---|---|
| 2012/0033313 A1 | 2/2012 | Herrmann et al. |
| 2012/0188662 A1 | 7/2012 | Hamada et al. |
| 2015/0224930 A1* | 8/2015 | Foote .................... B60R 1/076 |
| | | 359/872 |
| 2017/0210282 A1* | 7/2017 | Rodriguez Barros . B60Q 1/324 |

FOREIGN PATENT DOCUMENTS

| | | |
|---|---|---|
| FR | 2820096 A1 | 8/2002 |
| JP | 2014-31063 A | 2/2014 |

OTHER PUBLICATIONS

Deckard et al. CN 107745746, Parallel Type Vehicle (Year: 2020).*
Losert et al., EP 1285797 A1, Body Fixed Guide Rail For an Adjustable Element of a Vehicle Body (Year: 2003).*
Lettis et al. Sealing Means, Basic Arrangement With Such a Sealing Means and Rearview Device With Such a Basic Arrangement, DE 102018116011 (Year: 2020); Examiner added a machine translation.*
Extended European Search Report, Appl. No. 22613605.3, dated Aug. 12, 2022.
German Office Action dated Sep. 7, 2021 of application DE 10 2021 107 588.2.
German Patent Office, Appl. DE 10 2021 107 588.2, Decision to grant a patent, Aug. 8, 2022.

* cited by examiner

2K DOOR GASKET, REAR VIEW DEVICE, VEHICLE AND ASSEMBLING AND ATTACHMENT METHOD

CROSS-REFERENCE TO RELATED APPLICATIONS

This application claims priority to German Application No. DE 10 2021 107 588.2, filed on Mar. 25, 2021, which is incorporated by reference in its entirety for all purposes.

BACKGROUND

1. Field

The present disclosure refers to sealing means adapted to be installed between a base assembly of an exterior rear view device and a door panel of a door of a vehicle, a rear view device with a head assembly, a base assembly comprising such a sealing means, a vehicle with such a rear view device and a method for assembling said rear view device and attaching the same to a vehicle.

2. Related Art

A rear view device typically includes a base assembly to be attached to a vehicle and a head assembly to be moveable relative to the base assembly. Generally the head assembly of a rear view device can be rotated between a driving position and a parking position.

The term "rear view" may refer to a view of the surrounding area, which is not in the field of view of a driver of a vehicle, i.e. the directions opposing, left, right, below and above of the viewing direction, but can also comprise the view in the direction of the viewing direction of the driver and/or any combinations of the directions. The rear view can be achieved via at least one rear view element in form of a reflective element like a mirror and/or an image acquisition means like a camera. The rear view, that is the field of view of the driver, can be adjusted by moving, in particular rotating, the reflective element and/or the image acquisition means. This in turn can be realized by moving the complete head assembly together with the reflective element and/or the image acquisition means such that the head assembly of the rear view device can be rotated also between a plurality of viewing position.

For moving the head assembly, the reflective element and/or the image acquisition means an actuator assembly is comprised by the rear view device, which can be controlled by a first control unit within the vehicle. Also the image acquisition means can be controlled via a second control unit, wherein both control units may be formed together. However, for the purpose of controlling data have to be transferred between the rear view device and the control unit within the vehicle requiring a harness.

For facilitating moving the head assembly together with the reflective element and/or the image acquisition means specific pivot joint systems have been developed, see WO 2018/215599 A1, as well as specific actuator assemblies, see WO 2019/002627 A1.

The structure of the base assembly of an exterior rear view device is important as it provides means for connecting the device to a vehicle. US 2020/0001791 A1 refers to a base assembly of an exterior rear view device, comprising a base frame; and a base cover housing the base frame and formed in at least two parts connected to each other, wherein the base assembly comprises a first opening at a first end of the base assembly at which the base frame is configured to be attached to a vehicle and a second opening at a second end of the base assembly at which a head assembly of the exterior rear view device is configured to be attached to the base frame, wherein at least one of a first sealing means at the first opening is provided comprising a two-component gasket with a hard component and a soft component, the hard component comprising: at least one first connection element configured to engage at least one first connection element of a first cover part; and at least one first connection element of a second cover part configured to provide a locking connection between the first cover part and the second cover part, and/or a second sealing means at the second opening is comprising a two-component gasket with a hard component and a soft component, the hard component comprising: at least one second connection element configured to engage at least one second connection element of the first cover part; and at least one second connection element of the second cover part to provide a locking connection between the first cover part and the second cover part.

The base frame fulfills a multitude of functions, in particular that of supporting the head assembly and connecting the same as well as electronic components of the exterior rear view device to the vehicle and a central control unit within the vehicle, the latter requiring a harness to be safely guided and sealed, electrically as well as with respect to moisture. As the base frame is made of metal, often aluminum, fulfilling said functions is a challenge.

SUMMARY

An object of the present disclosure to provide a sealing means suited to be installed between a base assembly of a rear view device and a vehicle, for simultaneously fulfilling several functions within the rear view device as well as between the rear view device and the vehicle to which the exterior rear view device to attached.

The object of the present disclosure is achieved according to a first aspect by sealing a means provided in form of a 2K door gasket with a door gasket seal and a door gasket substrate for a 2-way simultaneous sealing comprising an inner sealing to the base frame and an outer sealing to a cover of the base frame, in particular a lower base cover, and/or to the door panel.

According to embodiments the door gasket seal is formed from rubber and/or with an S shape cross-sectional geometry, and/or the door gasket substrate is formed from plastic and/or with one or more clips, hook pockets, location ribs, projections, screw openings and/or datum areas, and/or the sealing means is formed in one cavity in a 2K tool.

In certain embodiments the hook pockets provide location and positional control whilst assembling the sealing means to the base frame, and/or the hook pockets and/or the ribs are adapted to be assembled with the lower base cover, and/or the hook pockets and/or the ribs are adapted to lock and locate the sealing means in all three directions, and/or the clips are adapted to assemble with the base frame.

It is proposed that the clips are adapted to assemble with the base frame, with a retainer means being arranged therebetween, and/or the screw openings are adapted for screws to secure the sealing means, preferably together with the retainer means, to the base frame.

It is further proposed that a datum area is adapted to locate an upper base cover and/or to provide the strength of the base frame to the cover thereof, and/or a projection is adapted to secure the whole cover assembly of the base frame by being engaged by a clip, in particular hoop clip of the upper base cover.

According to another embodiment, the sealing means provides at least part of a channel, preferably together with the base frame and the retainer means, with said channel being adapted for positioning and/or locating a glass run seal.

The object of the present disclosure is also achieved according to a second aspect by an exterior rear view device, with a base assembly to be attached to a vehicle, a head assembly for supporting at least one reflective element and/or camera, with the head assembly being attached to the base assembly in a moveable manner, and a sealing means according the present disclosure and being adapted to be installed between the base assembly and a door of the vehicle.

One embodiment further comprises a cover of the base frame being formed as a metal unit, said cover preferably being made of plastic and/or comprising a lower base cover, a base cover cap and an upper base cover, and/or a camera, preferably attached to the base frame and/or viewing through an opening provided by the lower base cover, and/or a retainer means between the base frame and the sealing means, with the retainer means preferably being a plastic unit for sealing and guiding harness.

An object of the present disclosure is also achieved according to a third aspect by a vehicle with a door having a door panel and supporting a window as well as a cheater panel sealed by a glass run seal, wherein the door panel also supports an exterior rear view device of the present disclosure It is proposed that the door gasket seal of the sealing means provides a first sealing area for an inner sealing to the base frame, a second sealing area for an outer sealing to the lower base cover, and a third sealing area for an outer sealing to the door panel.

In one form, it may be that the sub-assembly of the base frame, the retainer means and the sealing means forms the channel for positioning and locating the glass run seal, with preferably a sealing lip of the glass run seal engaging the cheater panel on the one side and the base cover cap as well as the upper base cover on the other side for sealing the gap between.

According to a forth aspect of the present disclosure, the object thereof is achieved by a method for assembling an exterior rear view device, in particular in line with the present disclosure, and attaching the same to a vehicle, in particular in line with the present disclosure by using a sealing means according to the present disclosure, comprising the following steps: attaching the sealing means to the base frame on the one side and to the door panel on the other side by a snap, clips, latch and/or screw connection, and engaging the door gasket seal of the sealing means with the edge of the lower base cover and rotating the lower base cover on the base frame until one or more first attachment means, in particular hooks, of the lower base cover engage complementary second attachment means, in particular hook pockets and/or ribs, of the door gasket substrate.

In one embodiment it is proposed that prior to attaching the sealing means to the base frame, the retainer means is attached to the base frame by a snap, clips and/or latch connection, preferably after attaching the harness to the retainer means, and/or the lower case is attached to the head assembly by passing the base frame with the retainer means preferably together with the harness, through an opening of the lower case.

It is also proposed that attaching the base frame with the retainer means and the sealing means to the door panel comprises a 3rd hand clip/hanger function, preferably making usage of a hook of the base frame adapted to hold the base frame with at least a part of the head assembly in Y direction to assist a screw assembly, and a clip of the base frame being arranged on secondary location keyway to highlight when the exterior rear view device is in its final assembly Z position.

The method of the present disclosure may comprise also the following step: the cheater panel pushing the glass run seal into the channel provided by the base frame, the retainer means and the sealing means, preferably while the base cover cap and the upper base cover being rotated in place, and/or preferably such that the sealing lip of the glass run seal is pushed against the cheater panel sealing the gap between the base cover cap and the upper base cover on the one side and the cheater panel on the other side.

Further, it may be proposed that the base cover cap slides along a ramp on the lower base cover which locks in behind the base cover cap and creates a rotation point to rotate the base cover cap into its final position, and/or the base cover cap, the lower base cover and the base cover cap are connected by snap, clips and/or latch connection, without screws, and/or the assembly of the base cover cap, the lower base cover and the base cover cap is secured by engaging the sealing means.

Finally, according to the present disclosure the following features may be realized: a tab of the base cover cap is entered into an opening of the lower base cover for defining the attachment direction and locks in behind the base cover ca for creating said rotation point, and/or the base cover cap is rotated into its final position, with the base cover cap preferably being forced to flex outboard while rotating, and/or a peg type projection of the base cover cap enters into a first slot in a multi-functional assembly projection of the lower base cover and another peg type projection of the base cover cap enters into another slot in the multi-functional assembly projection of the lower base cover as well as flexes back into a further opening of the lower base cover for controlling the final fit of the base cover cap, and/or at least one, preferably three alignment features are provided by the upper base cover, in particular in form of projections, and lead two clip retention features, in particular in form of the clip retention extensions, of the upper base cover onto corresponding clips of the base cover cap, and/or a bottom clip of the upper base cover goes into a pocket in the lower base cover and locates the bottom parts of the upper base cover and the lower base cover, and/or a hoop clip of the upper base cover engages with a projection of the door gasket substrate.

BRIEF DESCRIPTION OF THE DRAWINGS

The foregoing summary, as well as the following detailed description, will be better understood when read in conjunction with the appended drawings. For the purpose of illustration, certain examples of the present disclosure are shown in the drawings. It should be understood, however, that the present disclosure is not limited to the precise arrangements and instrumentalities shown. The accompanying drawings, which are incorporated in and constitute a part of this specification, illustrate an implementation of system, apparatuses, and methods consistent with the present disclosure and, together with the detailed description, serve to explain advantages and principles consistent with the present disclosure, wherein:

FIG. 5c is a cross-section of the sub-assembly of FIG. 5a taken along the line B-B of FIG. 5a;

FIGS. 7a and 7b are perspective views demonstrating the assembly of a base cover cap to the sub-assembly shown in FIG. 5a;

DETAILED DESCRIPTION

Figure 6A:
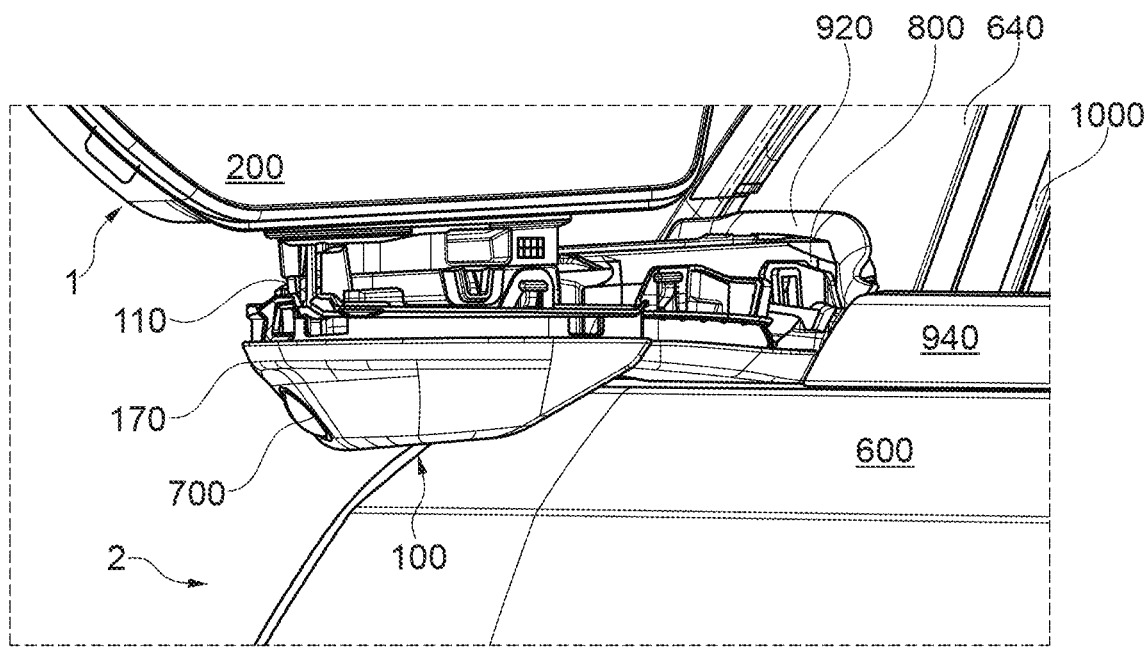
FIG. 6a is a perspective view of the sub-assembly of FIG. 5a attached to a vehicle.
Figure 6B:
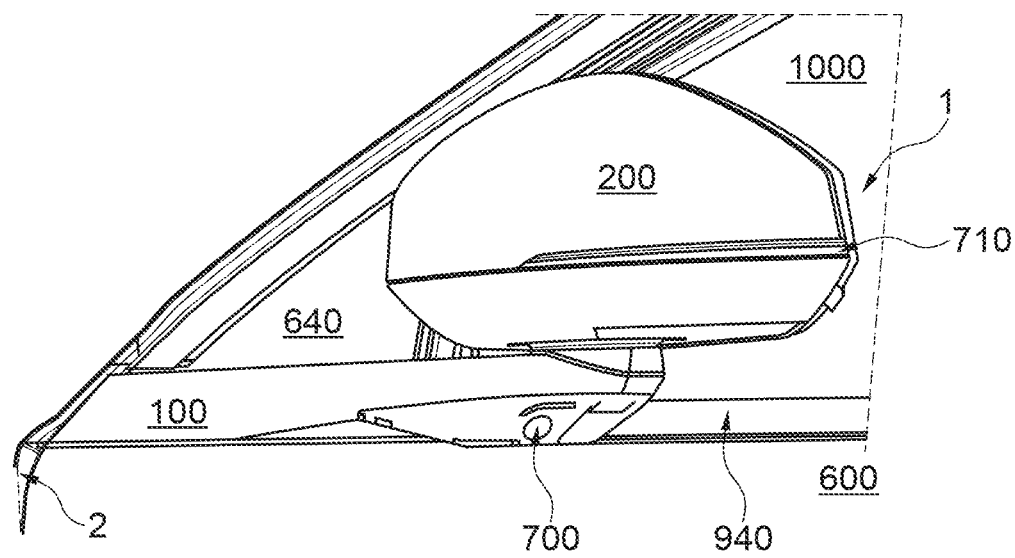
FIG. 6b is a perspective view of an exterior rear view device of the present disclosure with a sealing means of the present disclosure and attached to a vehicle of the present disclosure.

FIGS. 1a to 1f show a base cover lower or lower base cover 170 and a base frame 110 of a base assembly 100 of an exterior rear view device 1 of the present disclosure as shown in particular in FIG. 6b as well as a sealing means 800 according to the present disclosure. The sealing means 800 is to be attached to both, the lower base cover 170 and the base frame 110 and to be arranged between the base assembly 100 and a vehicle 2 to which the exterior rear view device 1 is attached as shown in FIG. 6b. Before describing the attachment of the lower base cover 170, the base frame 110 and sealing means 800 to each other, the structural features of each one of these three elements is described.

Figure 1A:
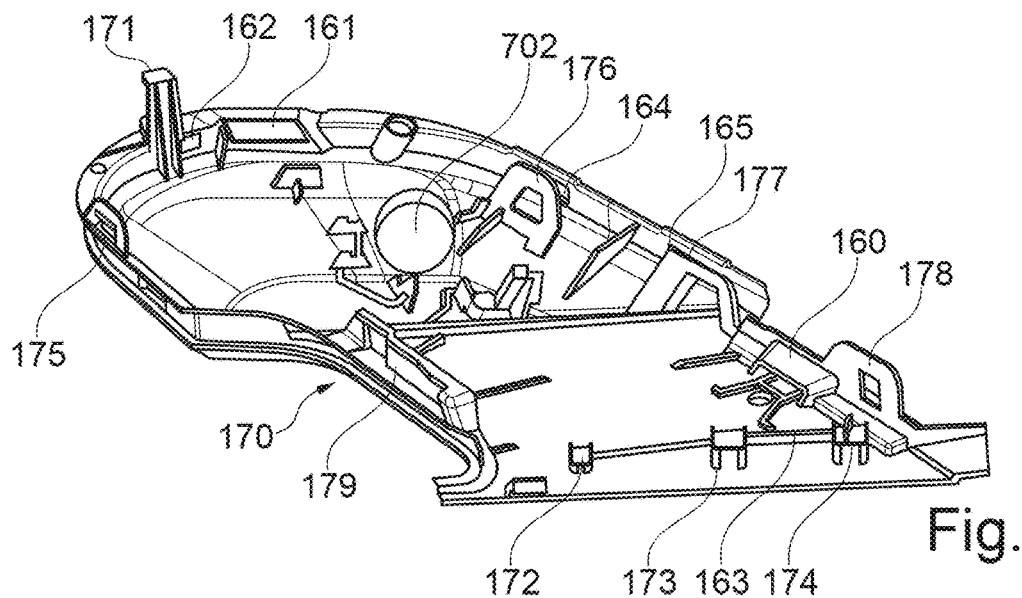
FIG. 1a is a perspective view of a lower base cover of a base assembly of an exterior rear view device of the present disclosure.

The lower base cover 170 of FIG. 1a is a single plastic piece with a multi-functional assembly projection 171, several hooks 172 to 174, several clips 175 to 179, a pocket 160, several openings 161, 162, 164 and 165 and a wall 163. Further, the lower base cover 170 provides an opening 702 for a camera 700, see FIG. 6b.

Figure 1B:
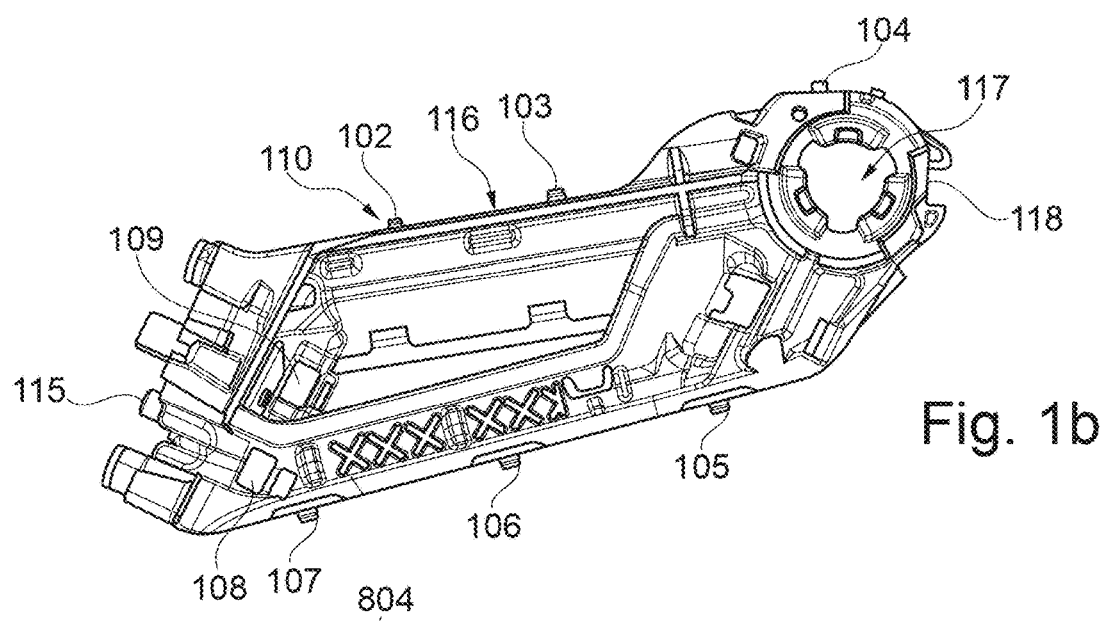
FIG. 1b is a perspective view of a base frame to which the lower base cover of FIG. 1a is to be attached.

The base frame 110 of FIG. 1b is provided in form of an aluminum unit with a plurality of clips 102 to 107 and three hook apertures 108, 109 and 118. The unit can be divided into three portions, i.e. a door attachment portion 115, an arm 116 and a head attachment portion 117, with the door attachment portion 115 running substantially parallelly to a door 600 of the vehicle 1 shown in FIGS. 6a and 6b, whereas the arm 116 extends substantially perpendicularly away from the door attachment portion 115 and the head attachment portion 117 is provided at the end of the arm 116 opposite the one merging with the door attachment portion 115.

Figure 1C:
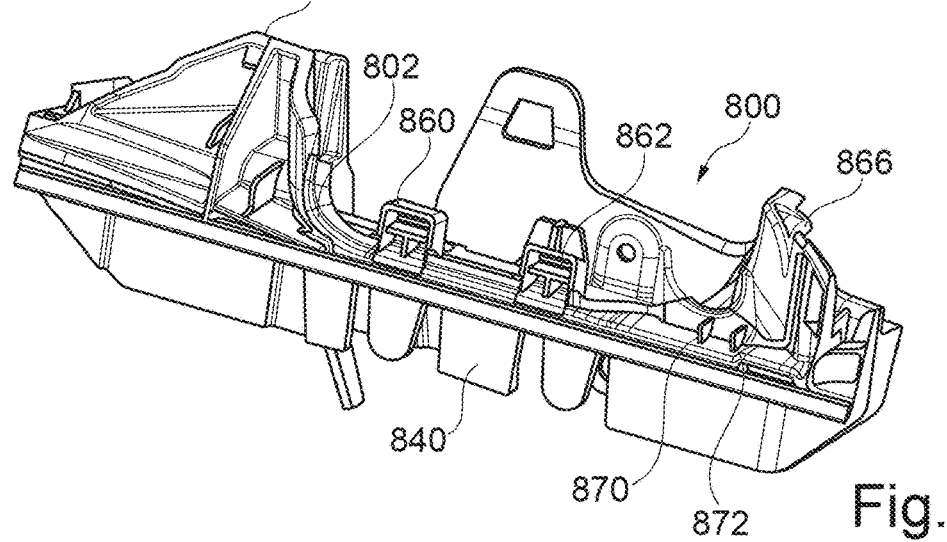
FIG. 1c is a perspective view of a sealing means according to the present disclosure, to be attached to both, the lower base cover of FIG. 1a and the base frame of FIG. 1b.

The sealing means 800 of FIG. 1c is provided in form of a 2K door gasket with a door gasket seal 802 and a door gasket substrate 804. The door gasket substrate 804 is formed with several clips 840 (only one being shown in FIG. 1c), two hook pockets 860 and 862 and two location ribs 870 and 872.

Figure 1D:
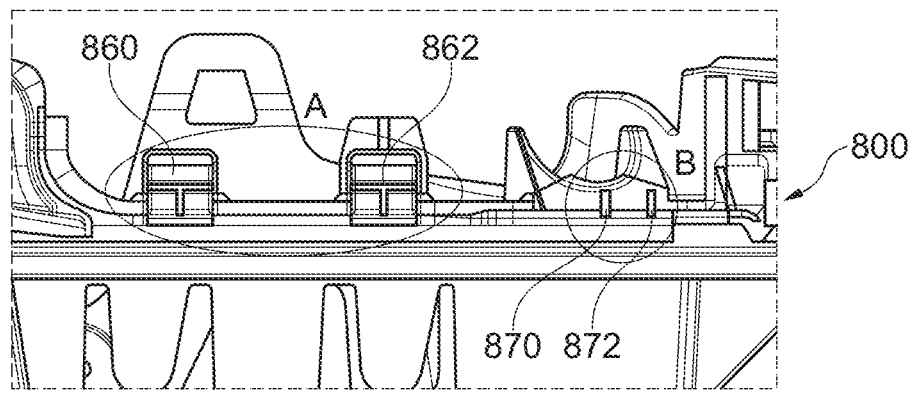
FIG. 1d is a part view of the sealing means of FIG. 1c.
Figure 1E:
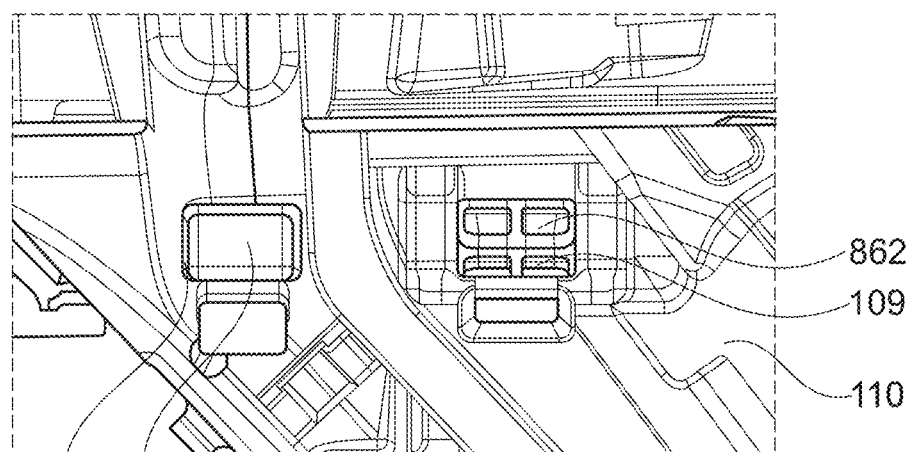
FIG. 1e is a perspective part view of a connection between the sealing means of FIG. 1c with the base frame of FIG. 1b.
Figure 1F:
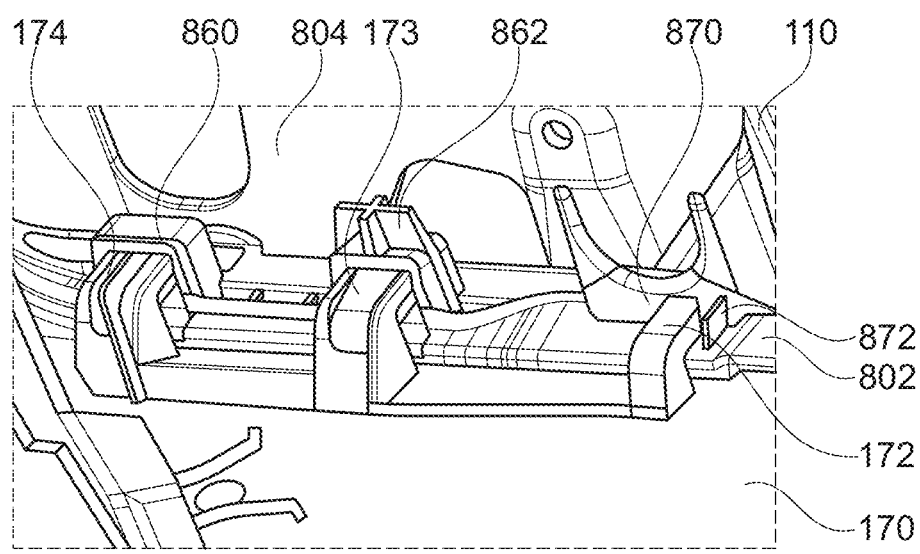
FIG. 1f is a perspective part view of a connection of the lower base cover of FIG. 1a to the sealing means of FIG. 1c.

FIGS. 1d and 1e demonstrate the attachment of the lower base cover 170 of FIG. 1a to the base frame 110 shown in FIG. 1b. The combination of the base frame 110, the sealing means 800 and the lower base cover 170 is shown in FIG. 1f to provide a locking system as described with respect to FIGS. 4a to 4c and not a screw assembly, accommodating a location as well as assembly method over the camera 700 into its final position.

The lower base cover assembly method allows a secure mounting of the components without using screws, as
- the lower base cover 170 is provided with the three hooks 172 to 174, the five clips 175 to 179 and the multi-functional assembly projection 171,
- the base frame 110 is provided with the two hook apertures 108 and 109, the 5 clips 103 to 107 and an aperture 118 for the multi-functional assembly projection 171, and
- the sealing means 800 is provided with the two hook pockets 860 and 862 and two hook ribs 870 and 871.

In detail, the hook pockets 860 and 862, shown in region A in FIG. 1d, are door gasket location features with multiple functions. They provide location and positional control whilst assembling the sealing means 800 to the base frame 110, with the hook pockets 860 and 862 of the sealing means 800 passing through the hook apertures 108 and 109 of the base frame 110 as soon as the sealing means 800 is attached to the base frame 110, see FIG. 1e. Along with the two ribs 870 and 872, shown in region B in FIG. 1d, the hook pockets 860 and 862 are used to assemble the lower base cover 170. As shown in FIG. 1f, the hooks 173 and 174 of the lower base cover 170 are engaged within the hook pockets 860 and 862 of the sealing means 800 as soon as the lower base cover 170 is attached to the sealing means 800. Further the third hook 172 of the lower base cover 170 is located between the two ribs 870 and 872 of the sealing means 800 as soon as the lower base cover 170 is attached to the sealing means 800. Thus, the hook pockets 860 and 862 and the ribs 870 and 872 of the sealing means 800 lock and locate the door gasket seal in all X+Y+Z directions. Critically the Z direction is locked which allows an accurate positional location for the sealing strategy.

Before further describing said sealing strategy, the assembly of the base frame 110 with a retainer means 301 to a case lower or lower case 220 of a head assembly 200 of the exterior rear view device 1 and the sealing means 800 is described with reference to FIGS. 2*a* to 2*f.*

Figure 2A:
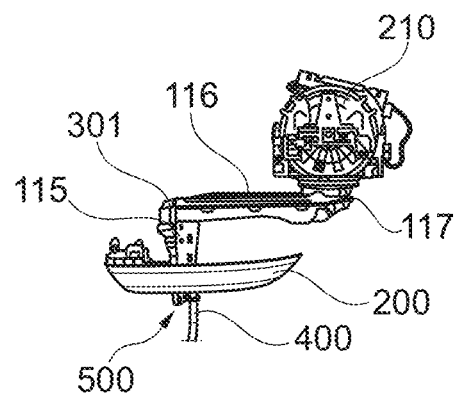
FIGS. 2a to 2f are perspective views demonstrating the assembly of the base frame with a retainer means and firstly a lower case of a head assembly of an exterior rear view device of the present disclosure and secondly the sealing means of FIG. 1c.
Figure 2B:
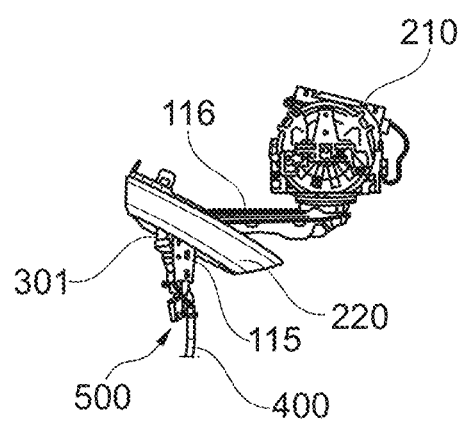
Figure 2C:
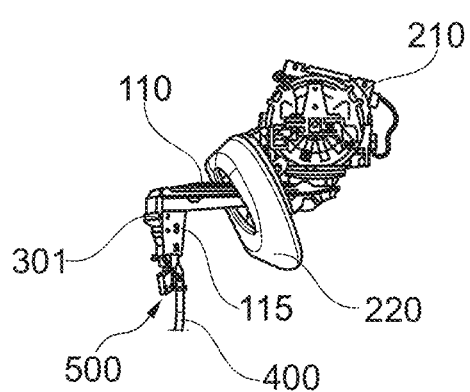
Figure 2D:
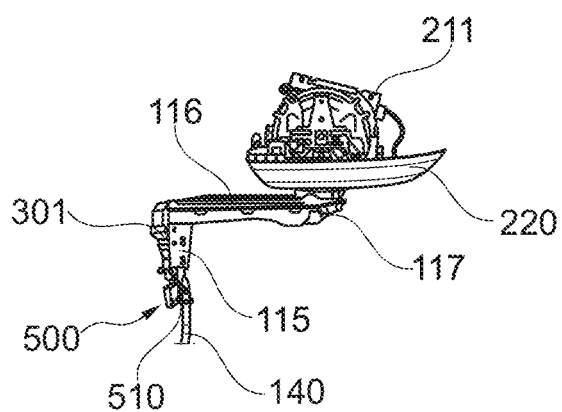
Figure 2E:
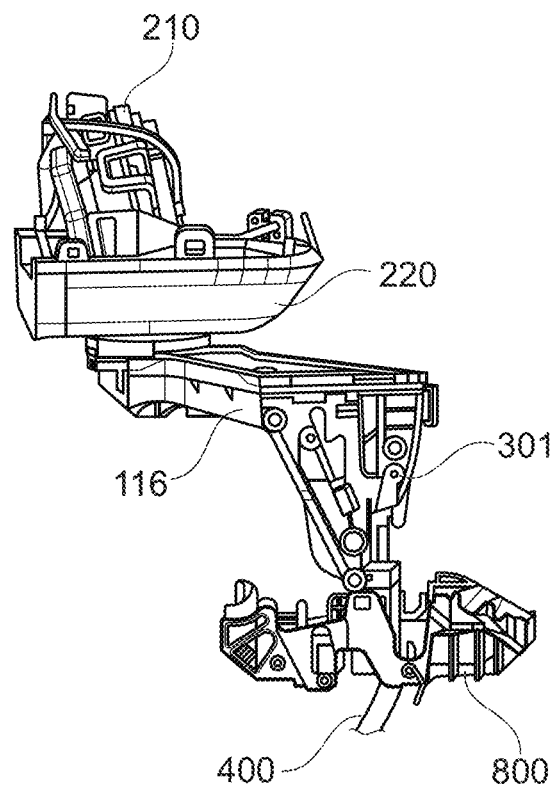
Figure 2F:
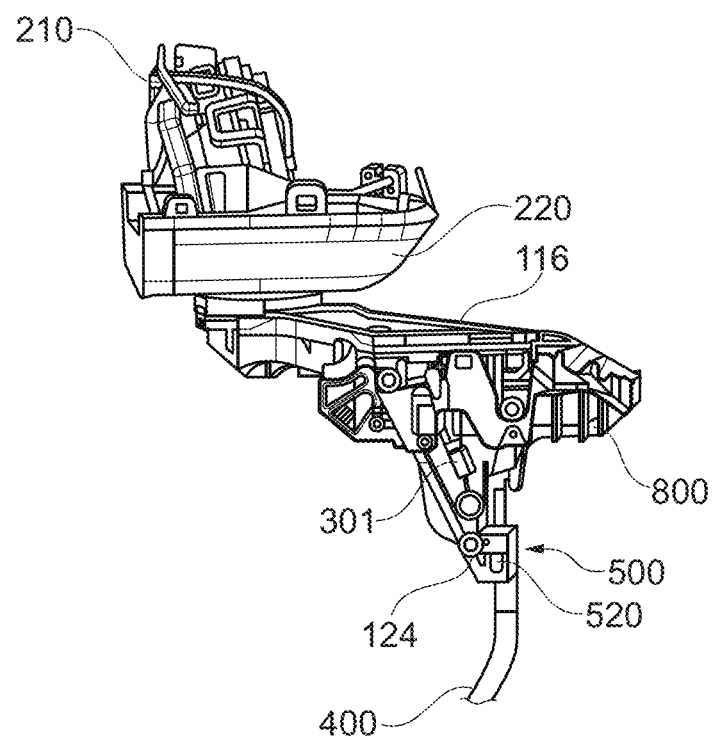

The slim design of the base frame 110 allows the lower case 220 of the head assembly 200 to be assembled over the door attachment portion 115 and the arm 116 of the base frame 110 to reach the region of the head assembly 200 with an actuator assembly 210, as shown in FIGS. 2*a* to 2*d*. In this respect it is to be noted that it is critical to assemble high gloss components like the lower case 220 late in the assembly sequence to minimize risk of damage. For that purpose the lower case 220 is provided with an opening 222, preferably being substantially circular, through which the base frame 110 together with the retainer means 301 can pass. The sealing means 800 is mounted after the lower case 220, as shown in FIGS. 2*e* and 2*f*. The sealing means location strategy is critical as it dictates the datum strategy for the corresponding base cover components.

The retainer means 301 is a multi-function component, which is formed as a single plastic element. An important function of the retainer means 301 is harness sealing, managing harness routing and accommodating variation in a camera harness and cleaning systems (not shown). For that purpose the door attachment portion 115 is provided with an opening 124 for a harness holder 500 at its lower, free end, as best seen in FIG. 2*f.* Said harness holder 500 is formed with a fixing tie 510 for holding a harness 400 and a clip 520 for connecting the holder 500 to said door attachment portion 115 by passing through the opening 124, see FIGS. 2*d* and 2*f.*

The base frame harness locator opening feature governs harness position length the door side and the rear view device side, and provides a strong retention eliminating risk of the harness 400 being misplaced e.g. by being pulled through during handling. Further, the locating feature leads to reduced tolerance of fit-to-door. In other words, the harness 400 is firmly located to the base frame 110 in all directions allowing a solid datum strategy for harness lengths and provides the ability to hold as well as transport the exterior rear view device 1 whilst holding on to the harness 400.

The harness 400 is suited for electrically connecting in particular a power source and a control unit within the vehicle (not shown) with electric components of the exterior rear view device 1. Such electric components may comprise, as e.g. shown in FIGS. 2*a* to 3*f* the actuator assembly 210 suitable for moving the head assembly 200 together with a reflective element (not shown) relative to the base frame 110 supporting the head assembly 200, and the camera 700 as well as an indicator means like a turn signal indicator 710 shown in FIG. 6*b*. Said harness 400 may comprise a camera harness 410.

The harness 400 as well as the camera harness 410 (see FIG. 3*c* below) divided therefrom above the harness holder 500 extend between the door attachment portion 115 of the base frame 110 and a holding portion 320 of the retainer means 301 to an upper end of the door attachment portion 115, which turns into the arm 116 of the base frame 110. For this purpose, the retainer means 301 is provided with guiding projections and channels for guiding the harness 400, 410 and sealing portions. As the retainer means 301 is not metallic, it allows sealing of the harness 400, 410, as well as increases safety of the attachment of the metallic base frame 110 to the door panel 605 becomes safer.

The design of the retainer means 301 allows to accommodate different sets of harness and cleaning system for all variations of mirror trim level. Further, the retainer means 301 ensures an easy assembly to seal in particular the camera harness 410 after being mounted and to manage its routing along the base frame door attachment portion 115, without departing from the commonly used datum system between the base frame 110 and the door panel 605.

As already mentioned above, the smaller base frame geometry and the provision of a separate 2K door gasket provided by the sealing means 800 permit the lower case 220 to be assembled over the base frame 110. In to following the attachment of the sealing means 800 to the base frame 110 with the retainer means 301 is described with reference to FIGS. 3*a* to 3*c:*

Clips 810, 830 and 840 as well as a clip opening 820 allow to attach the sealing means 800 to the base frame 110 which is provided with complementary steps 135 and 136 and openings 137 and 138. The base frame 110 also is provided with location projections 125 and 125 extending through the retainer means 301 as well as the sealing means 800 attached on top of the retainer means 30, see FIG. 3*a*.

Figure 3A:
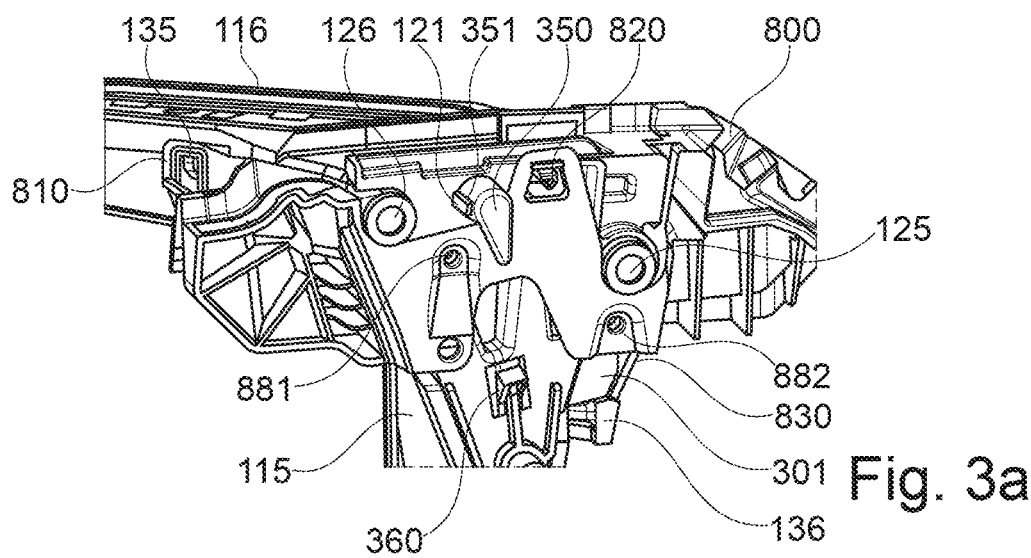
FIGS. 3a to 3c are perspective views demonstrating attachment features of the sealing means of FIG. 1c.
Figure 3B:
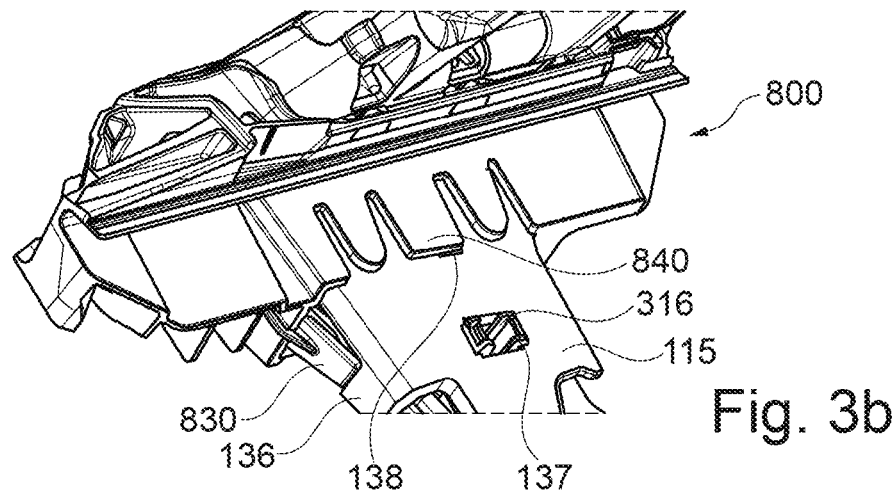
Figure 3C:
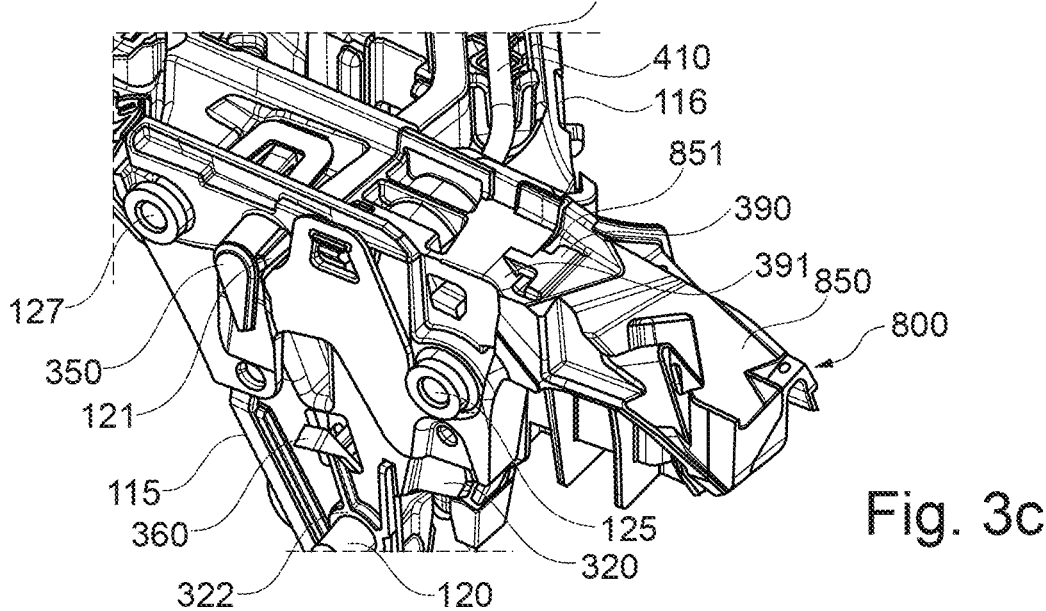

The sealing means 800 provides a datum area 850 for an upper base cover 190 as described with respect to FIG. 11*i*, with T-slots 391, 851 built into both the retainer means 301 and the sealing means 800, see FIG. 3*c*, to maximize and gain strength from the base frame into the area for upper base cover assembly.

Two screw positions determined by two openings 881 and 882 in the sealing means 800, best seen in FIG. 3*a*, allow to secure the sealing means 800 and the retainer means 301 to the base frame 110. These are package protections only if more strength is required.

The base frame 110 is provided with a location pin 120 as well as a T shaped location projection 121 belonging to the datum system ensuring a correct assembly of the components of the exterior rear view device 1 and a correct attachment of the exterior rear view device 1 to the vehicle 2. The retainer means 301 is provided with an opening 322 for the location pin 120 and a hook 350 with openings 351 for the arms of T shaped location projection 121, as can be best seen in FIGS. 3*a* and 3*c*.

The base frame T shaped location projection 121 and the location pin 120 provide the primary and secondary datum strategy to the door datum system in X+Z directions, while the Y direction is controlled using screw bosses. Thus, the corresponding locating features of the base frame 110 and the retainer means 301 allow base frame datum features to interface with the door 600 minimizing tolerance of datum strategy.

The retainer means 301 along with the location pin 120 and the T shaped location projection 121 not only provides an accurate assembly to the door panel datum system, but also facilitates the assembly as it provides a robust 3rd hand clip/hanger function. The hook 350 primarily serves to hold the exterior rear view device 1 in Y direction to assist assembly of the screws (not shown), while a clip 360 is on secondary location keyway to highlight when the exterior rear view device 1 is in its final assembly Z position, as best seen in FIGS. 3*a* and 3*c*.

Figure 4A:
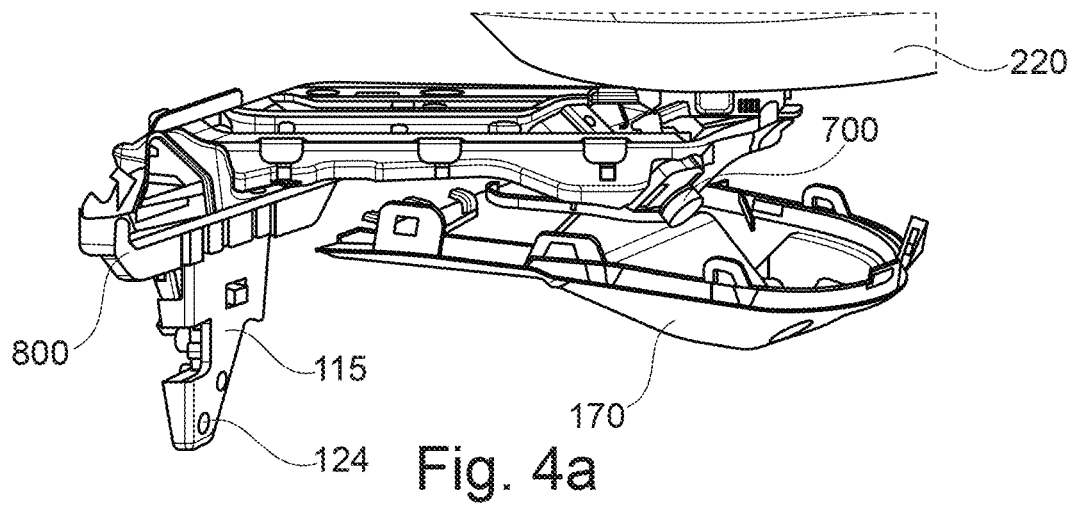
FIGS. 4a to 4c are perspective views demonstrating the attachment of the lower base cover of FIG. 1a to the base frame shown in FIG. 1b to which in particular the sealing means of FIG. 1c is attached.
Figure 4B:
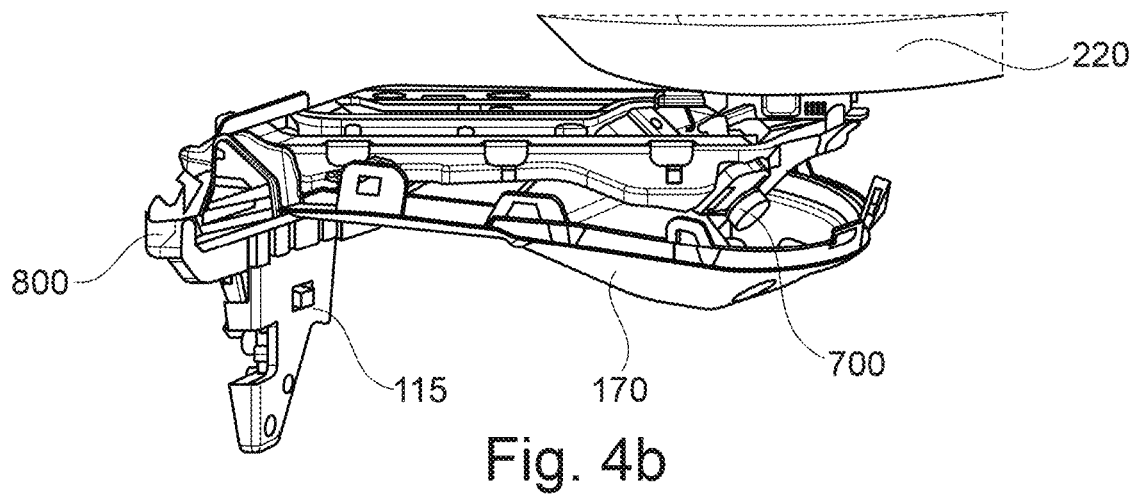
Figure 4C:
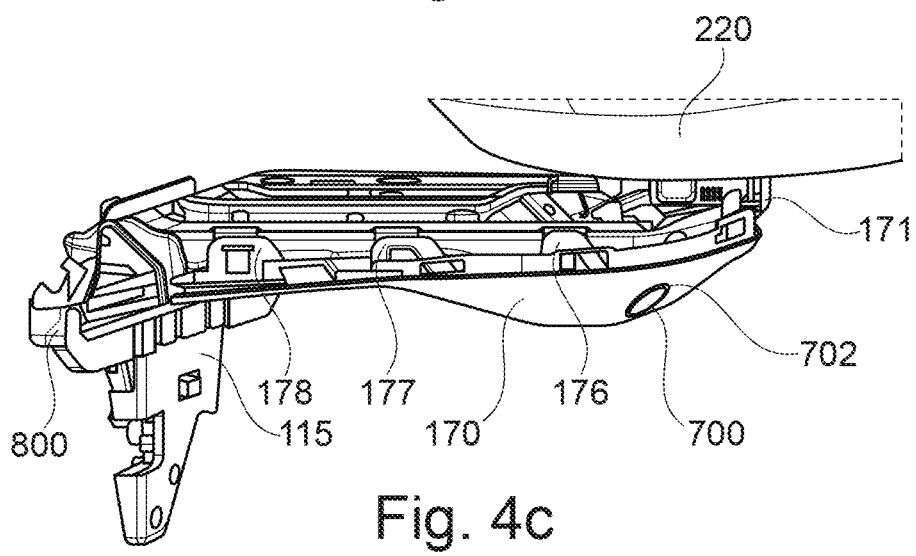
Figure 5A:
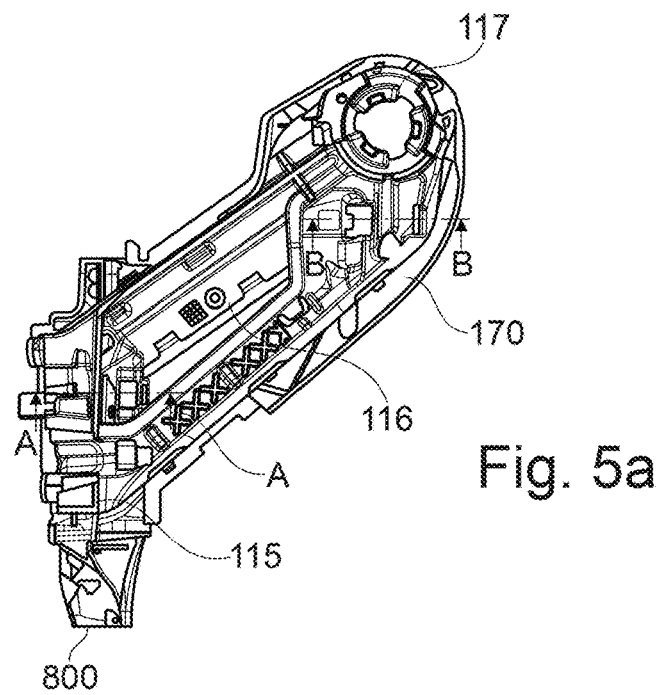
FIG. 5a is a top view on the sub-assembly of FIG. 4c.
Figure 5B:
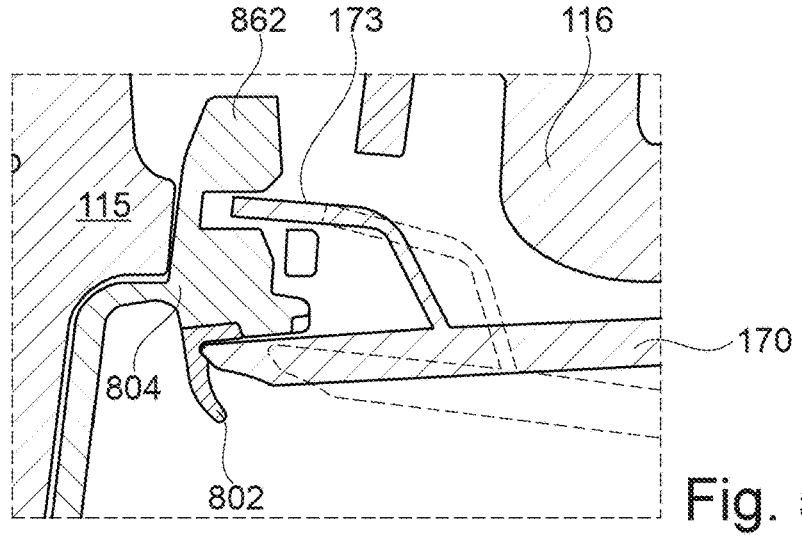
FIG. 5b is a cross-section of the sub-assembly of FIG. 5a taken along the line A-A.
Figure 5C:
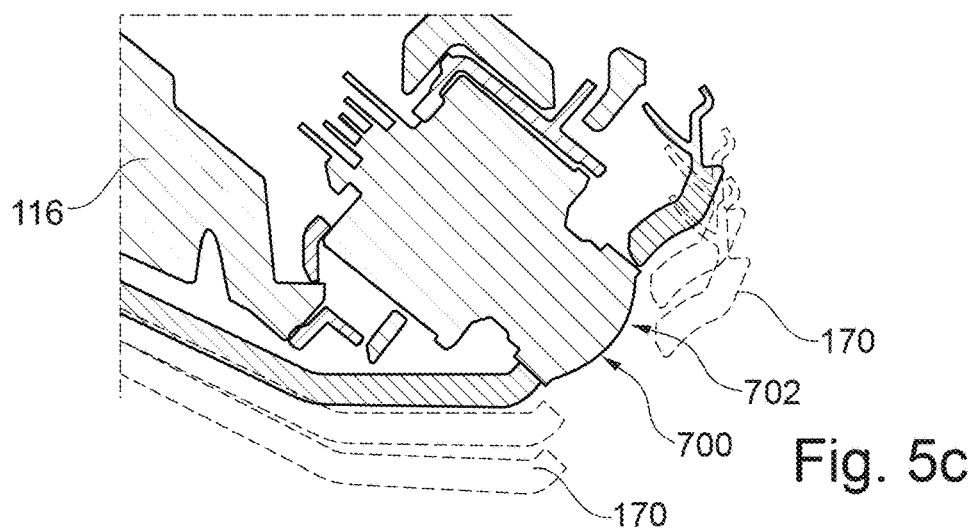

The assembly process of the lower base cover 170 to the sub-assembly of FIG. 2*f* is designed in such a way that the camera hole 702 in the lower base cover 170 avoids scratching or fowling the camera lens whilst rotating into final assembled condition, by first attaching the lower base cover 170 to the base frame 110 at the door attachments portion 115, then at the arm 116 and finally to the head attachment portion 118 as shown in FIGS. 4a to 4c, to come to the sub-assembly shown in FIG. 5a. FIGS. 5b and 5c show details of the rotational attachment:

At the beginning, at the door attachments portion 115 in FIG. 5b, the edge of the lower base cover 170 engages the door gasket seal 802 such that the hook 173 can rotate into the hook pocket 862 provided by the door gasket substrate 804, and at the end, at the head attachments portion 117 in FIG. 5c, the camera hole 702 is embracing the camera 700.

Figure 5D:
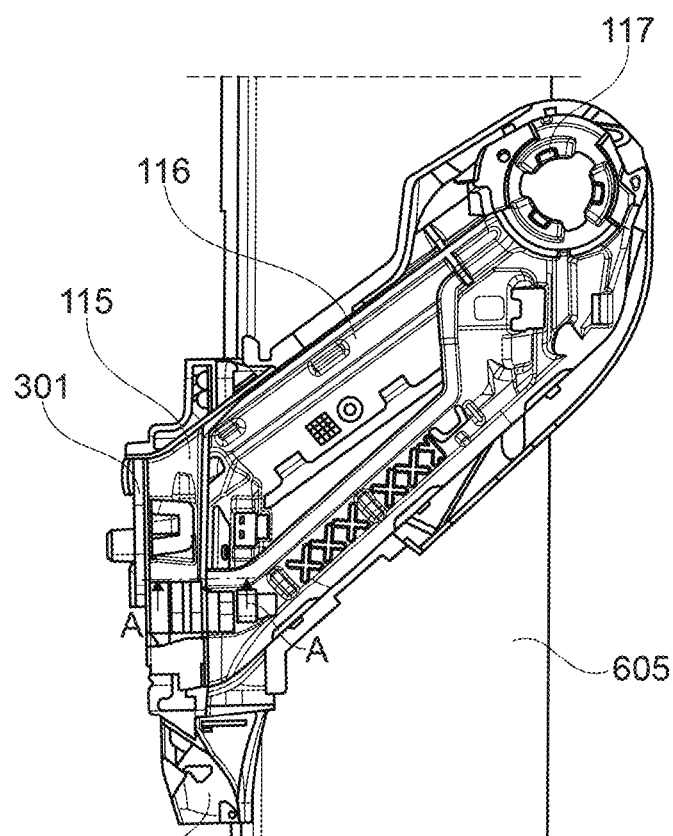
FIG. 5d is a view corresponding to the one of FIG. 5a, also showing a door panel to which the rear view device is attached.
Figure 5E:
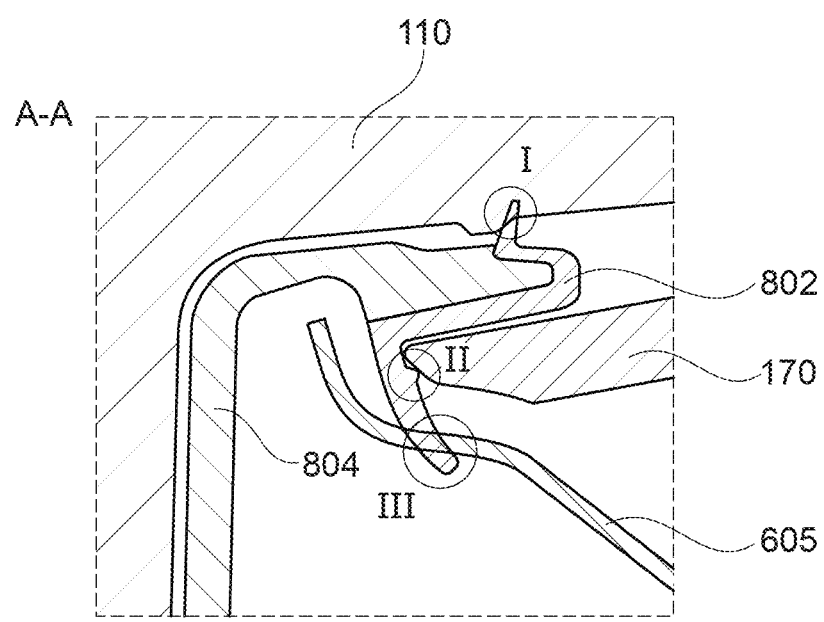
FIG. 5e is a cross-section taken along the line A-A of FIG. 5d.

The sub-assembly of the base frame 110, the retainer means 301, the sealing means 800 and the lower base cover 170 is shown in FIG. 5d, attached to a door panel 605. FIG. 5e shows a cross-section taken along the line A-A in FIG. 5d. From FIG. 5e the functions of the sealing means 800 as a 2K door gasket, including integrated 2-way simultaneous sealing function as well as providing datum, location and positional controls for matching the lower base cover 170, can be best seen.

In detail, the 2-way simultaneous sealing is achieved due to the more or less S shape cross-sectional geometry of the door gasket seal 802, which may be a rubber part formed together with the door gasket substrate 804, to allow sealing in three areas with only one cavity in a 2K tool. The three sealing areas are marked with I, II and III in FIG. 5d:

sealing area I provides an inner sealing to the base frame 110, sealing area II provides an outer sealing to the lower base cover 170, and sealing area III provides an outer sealing to the door panel 605.

The sealing means geometry between the exterior rear view device 1 and vehicle door 600 provides a tolerant and accurate sealing strategy when considering the assembly direction. The tolerance between door panel 605 and door datum system may be large as sealing lip of the door gasket seal 802 of the sealing means 800 accommodates for such variations The sub-assembly of FIG. 5d is also shown in FIG. 6a, but from another perspective and with the head assembly 200 attached. FIG. 6a shows further details of the vehicle 2 in the region of the door 600, namely a cheater panel 640 as well as a window 1000, with a glass run seal 920 as well as a wait finisher 940. In FIG. 6b the final rear view device 1 attached to the vehicle 2 can be seen. Accordingly, the exterior rear view device 1 holds the glass run seal 920 in a solid position and, thereby, provides a very pleasing overall appearance suggesting that the exterior rear view device 1 extends or rather grows out of the glass run seal 920 and/or the wait finisher 940.

Figure 7A:
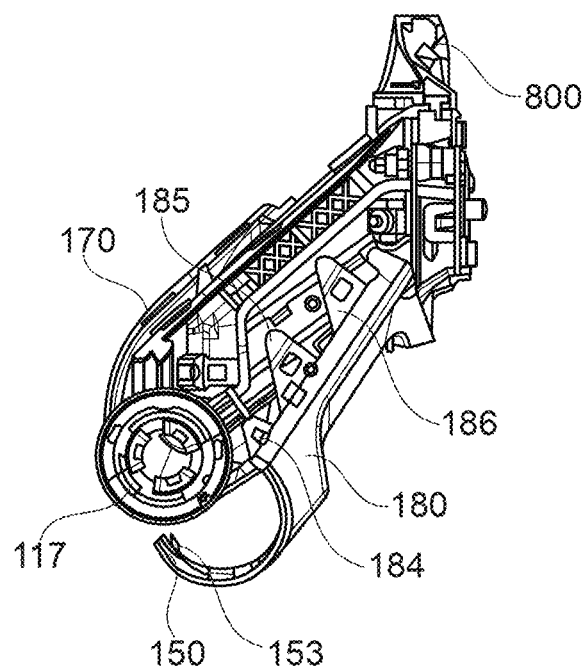
Figure 7B:
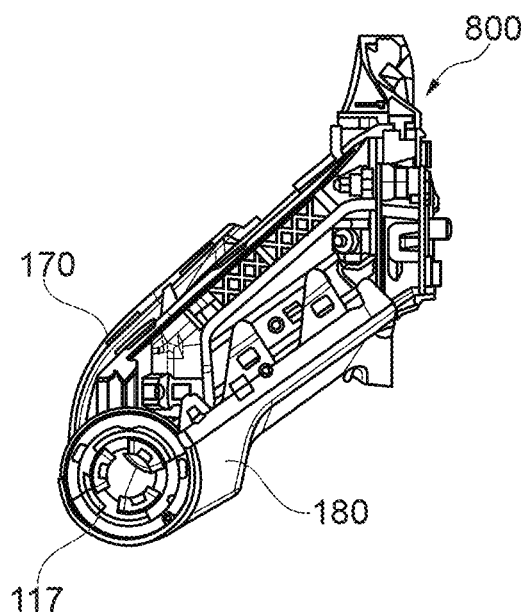

In the following it is described how to finalize the exterior rear view device 1. Next, starting from the sub-assembly of FIG. 5a, the assembly of a base cover cap 180 with projections 150, 153 and clips 184, 185 and 186 is described with respect to FIGS. 7a and 7b. Said assembly process of the base cover cap 180 is designed in such a way that the base cover cap 180 slides in along a ramp on the lower base cover 170 to lock in behind the base cover cap 180 creating a rotation point to rotate the base cover cap 180 into its final position.

Figure 8A:
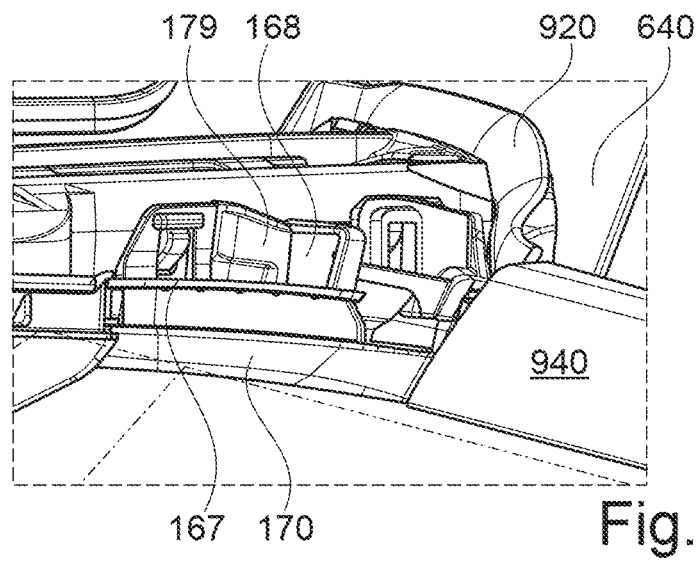
FIGS. 8a to 8e are perspective part views of the lower base cover of FIG. 1a, the base cover cap shown in FIGS. 7a and 7b and an upper base cover, demonstrating the attachment of those 3 elements to each other.
Figure 8B:
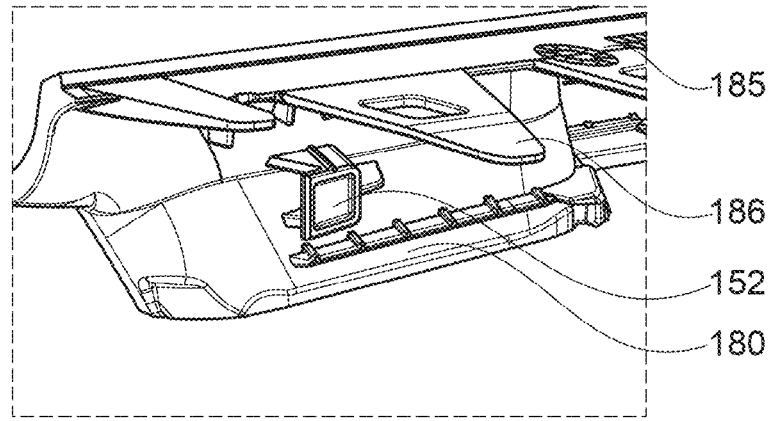

In order to better understand this assembly, FIGS. 8a to 8e illustrate the attachment step by step, by starting in FIG. 8a with a part view of the sub-assembly of FIG. 5a attached to the door panel in order to be arranged next to the glass run seal 920, and showing attachment features of the base cover cap 180 in FIG. 8b. Accordingly, the base cover cap 180 is provided with a tab 152 and clips 185 and 186.

Figure 8C:
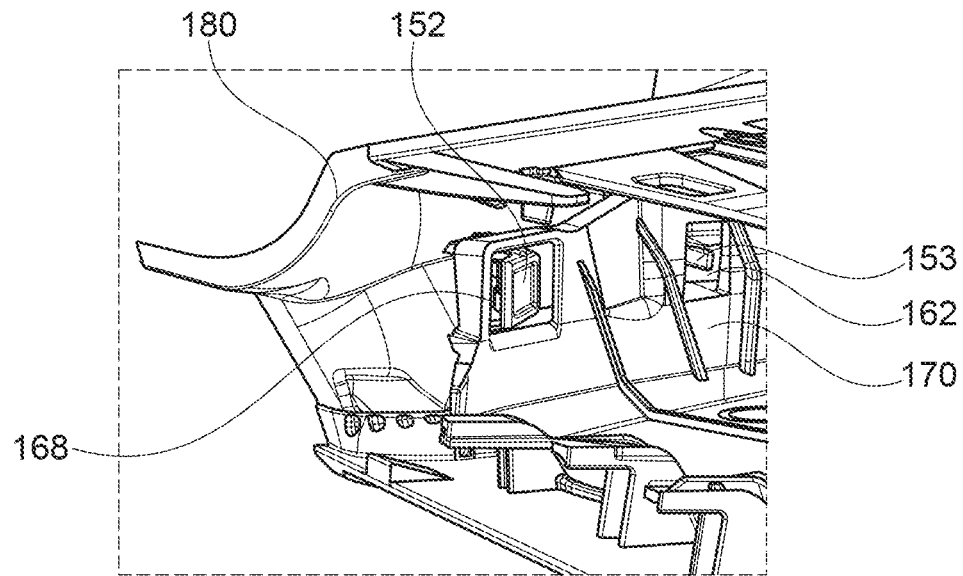

The tab 152 of the base cover cap 180 is to be entered into the opening 168 of the lower base cover 170, shown in FIG. 1a. Said tab 152 defines the attachment direction and locks in behind the lower base cover 170, as illustrated in FIG. 8c, for creating said rotation point.

Figure 8D:
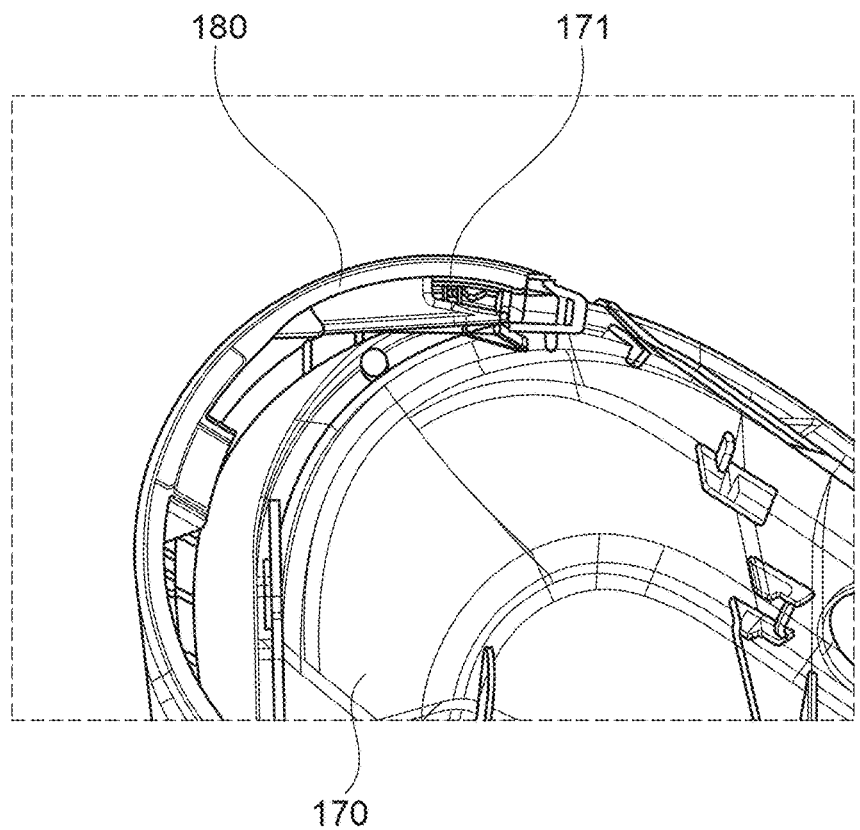

The next step is to rotate the base cover cap 180 into its final position. The rotation has been created such that no surrounding parts are scratched, by the outboard area of the base cover cap 180 being forced to flex outboard while rotating, as indicated in FIG. 8d.

Figure 8E:
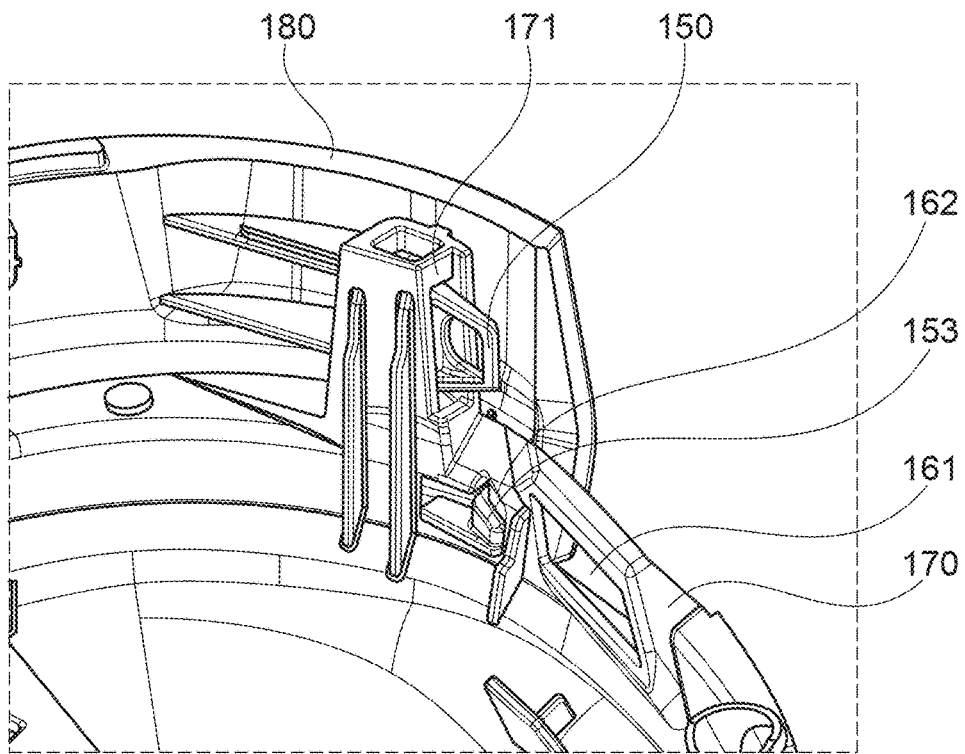

FIG. 8e shows a peg type projection 150 of the base cover cap 180 entering into a slot in the multi-functional assembly projection 171 of the lower base cover 170 and another peg type projection 153 of the base cover cap 180 entering into another slot in the multi-functional assembly projection 171 of the lower base cover 170 as well as flexing back into the opening 162 of the lower base cover 170 for controlling the final fit of the base cover cap 180.

Figure 9A:
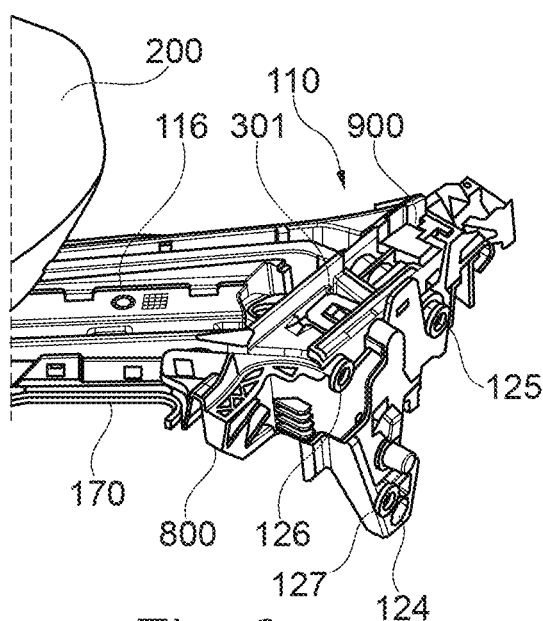
FIGS. 9a to 9f are perspective views demonstrating the assembly of a glass run seal, a cheater panel, the base frame, an base cap and the upper base cover with respect to the door panel and a window.
Figure 9B:
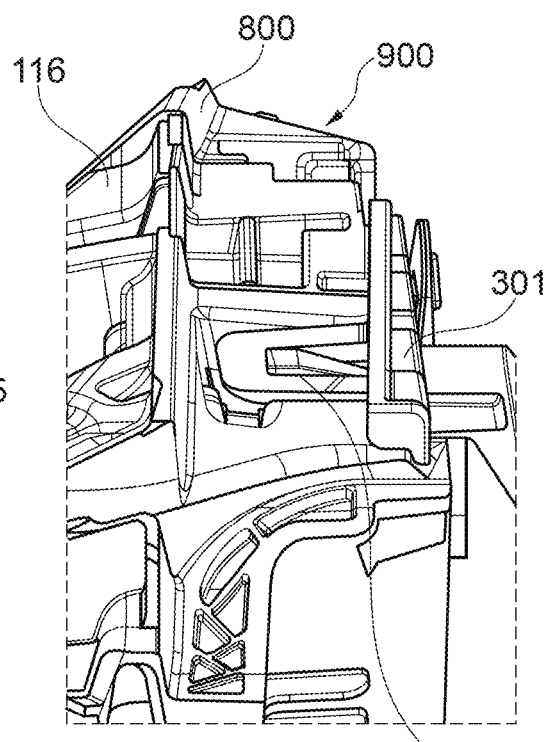
Figure 9C:
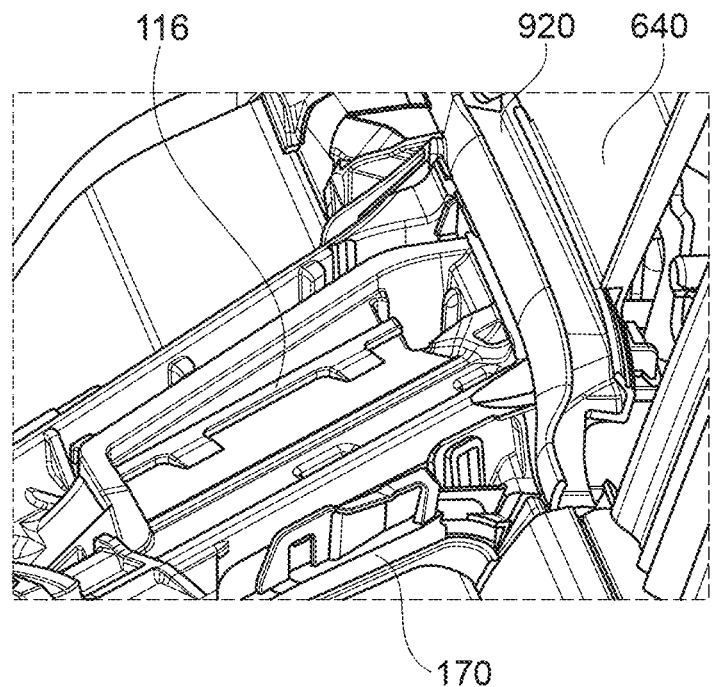

The sub-assembly of the base frame 110, the retainer means 301 and the sealing means 800 shown in FIG. 5a also forms a channel 900, see FIGS. 9a and 9b, for positioning as well as locating the glass run seal 920 in particular allocated to the cheater panel 640 as shown e.g. in FIG. 9c. In the following the attachment of the base cover cap 180 and the base cover upper or upper base cover 190 are described with reference to FIGS. 9d to 9f:

The combination the base frame 110, the retainer means 301 and the sealing means 800 forms the channel 900 which locates the glass run seal 920 on to the exterior rear view device 1. The glass run seal 920 runs along the cheater panel 640 and is an extension of the glass run seal running along the window 1000 and being covered by a door trim 940 as shown in FIGS. 6b, 9c and 9d.

Figure 9D:
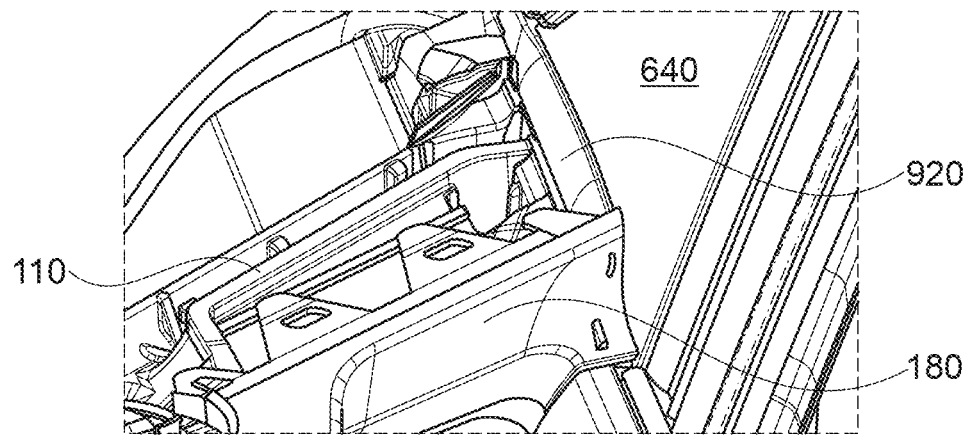
Figure 9E:
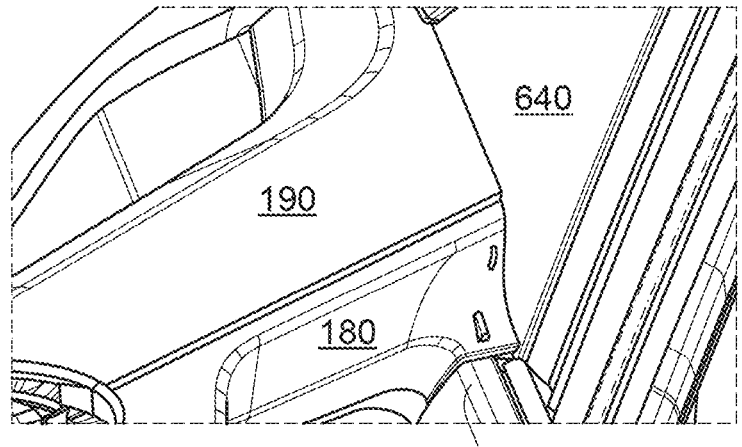
Figure 9F:
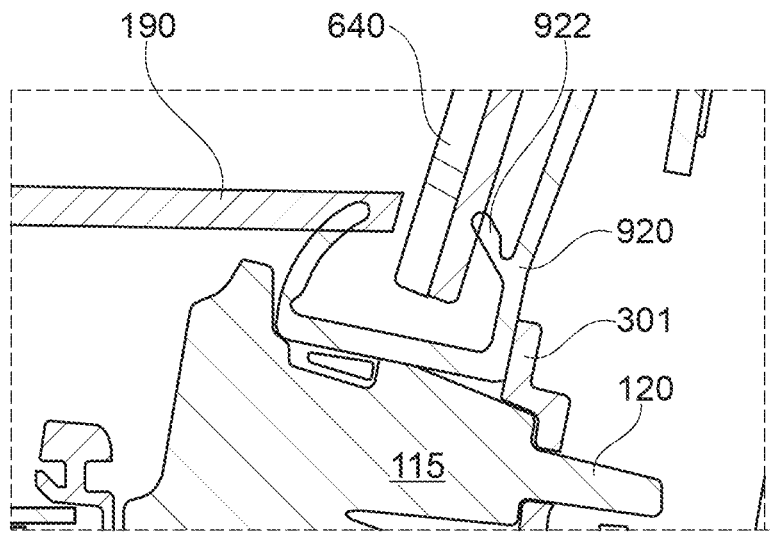

The base cover cap 190 clips to the base frame 110, see FIG. 9d, and also the upper base cover 180 is attached by clip connection, see FIG. 9e. The clip connection may be located behind a chrome waist finisher (not shown) and will be described below with respect to FIGS. 1a to 10i.

The cheater panel 640 pushes the glass run seal 920 into the correct position inside the channel 900 while being assembled. The base cover cap 190 and the upper base cover 180 assemble in such a way that when rotating into their position a sealing lip 922 the glass run seal 920 is pushed against the cheater panel 640 sealing the gap between the base cover cap 190 and the upper base cover 180 on the one side and the cheater panel 640 on the other side, see FIG. 9f.

Figure 10A:
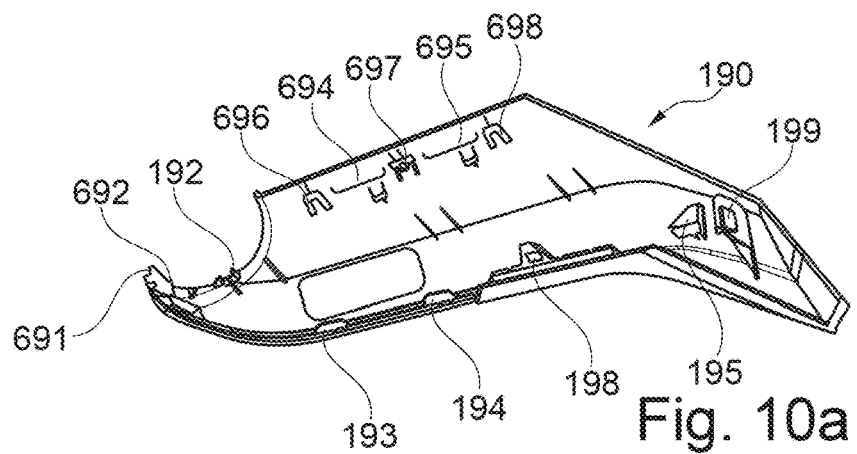
FIG. 10a is a perspective view of the upper base cover of FIG. 9e.
Figure 10B:
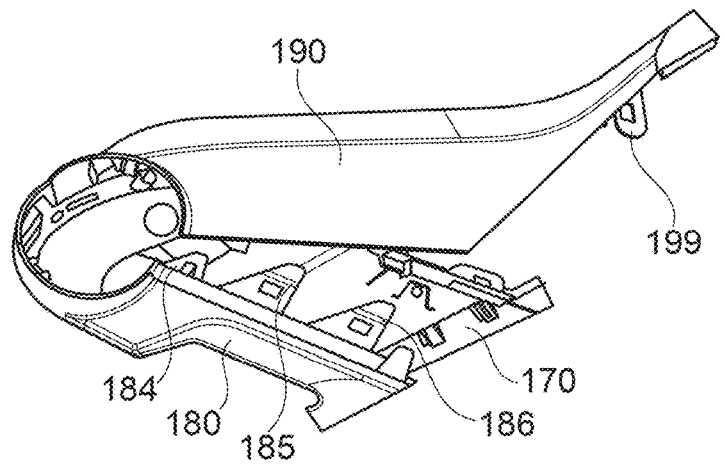
FIGS. 10b to 10i are perspective views demonstrating the attachment of the upper base cover of FIG. 10a with the lower base cover of FIG. 1a as well as the base cover cap of FIGS. 7a and 7b.

FIGS. 10a to 10i illustrate details of the attachment of the upper base cover 190 with the lower base cover 170 and the base cover cap 180. For that purpose, FIG. 10a shows the different attachment features of the upper base cover 190 with four location projections 192 to 195, a clip 198, a hoop clip 199, two location pegs 691, 692, two clip retention extensions 694 and 695 as well as three aligns projections 696 to 698.

Figure 10C:
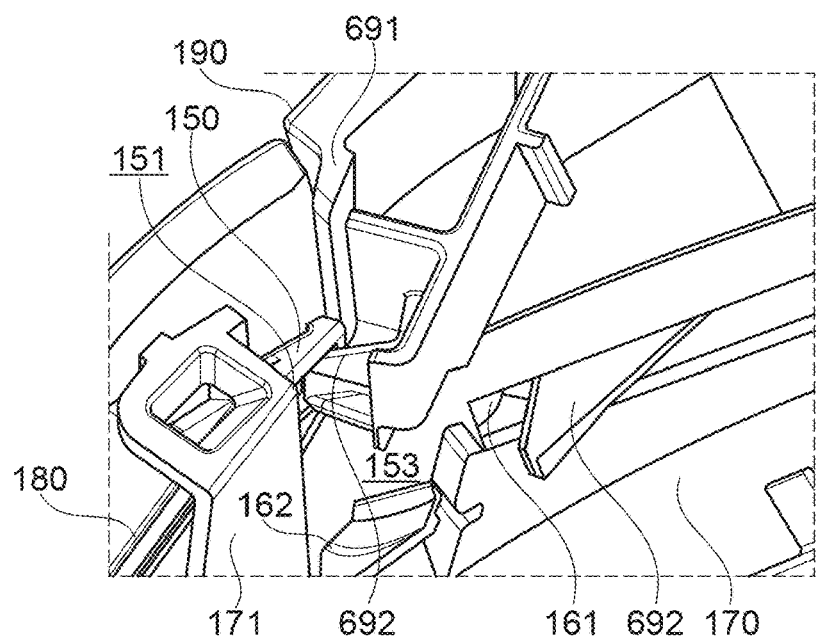
Figure 10D:
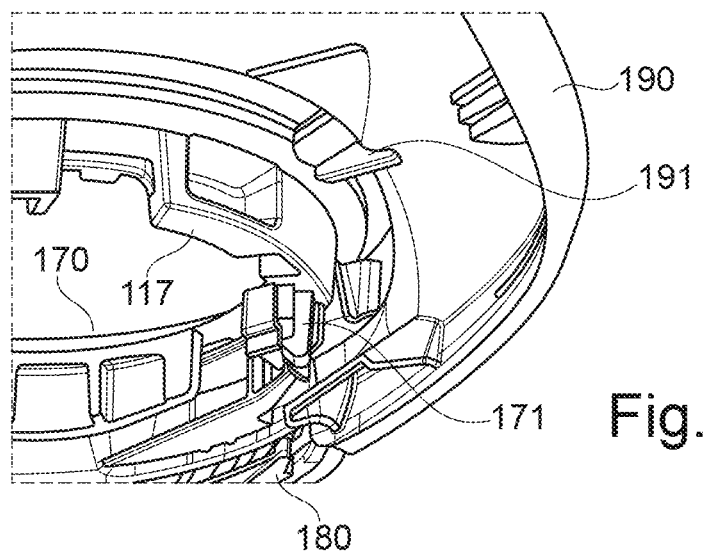
Figure 10E:
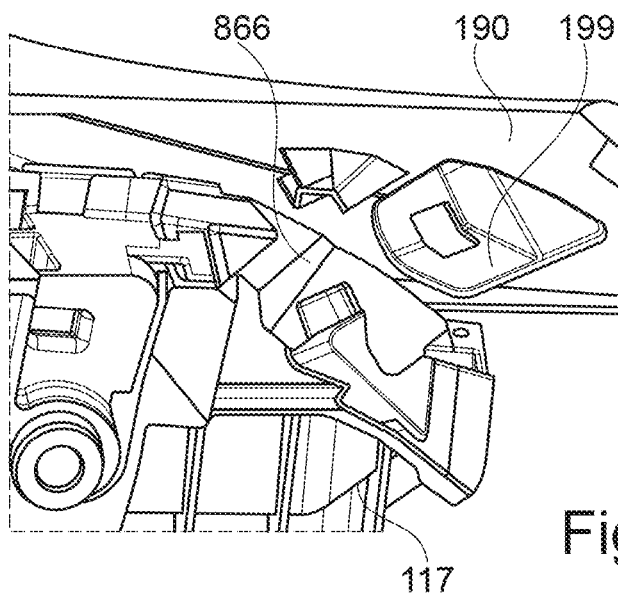
Figure 10F:
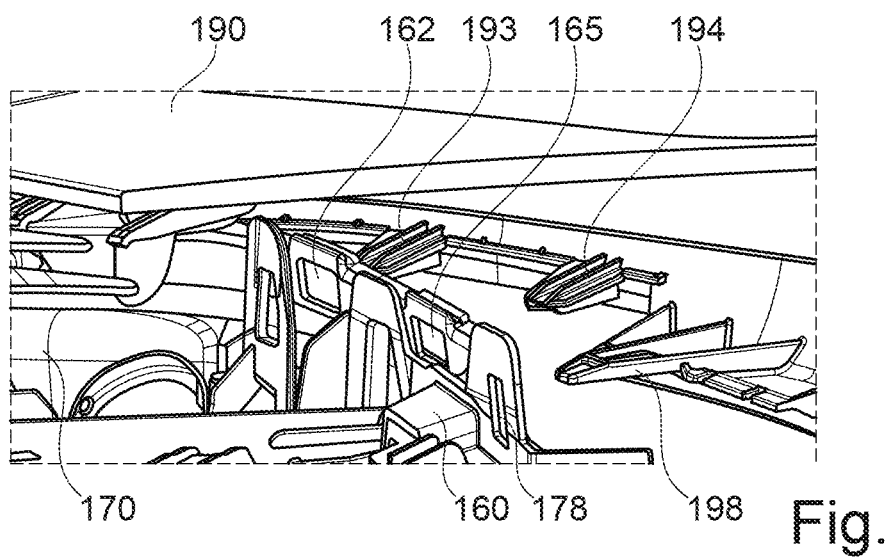

To assemble the upper base cover 190 the two location pegs 691 and 692 need to be fitted into two corresponding slots, one being provided by the opening 161 in lower base cover 170 and the other slot 151 being formed in the projection 150 of the base cover cap 180, see FIG. 10c. The peg 692 pulls the base cover cap 180 into the final position and defines the rotation axis for the components. Rotating the components results in engagement of the four location projections 192 to 195 to position the upper base cover 190, see FIGS. 11d to 11f.

Figure 10G:
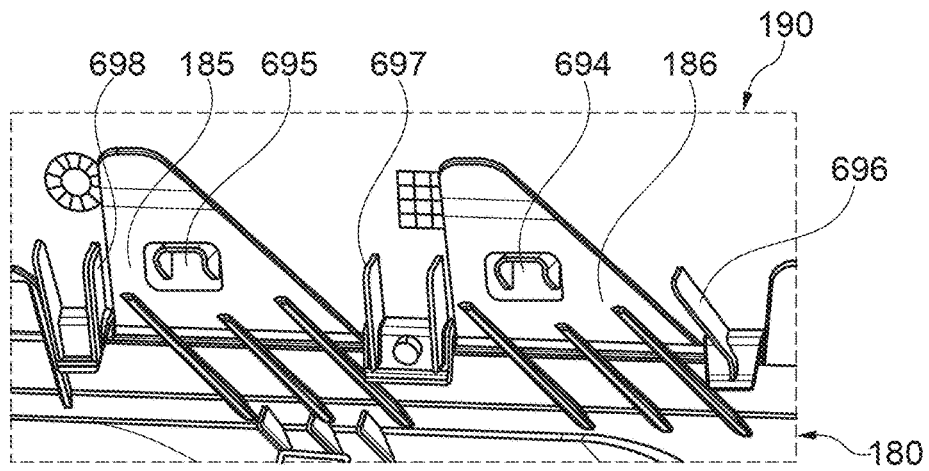

Three alignment features are provided by the upper base cover 190 in form of the projections 696 to 698 to align and lead two clip retention features in form of the clip retention extensions 694 and 695 onto the corresponding clips 185 and 186 of the base cover cap 180, see FIG. 10g.

Figure 10H:
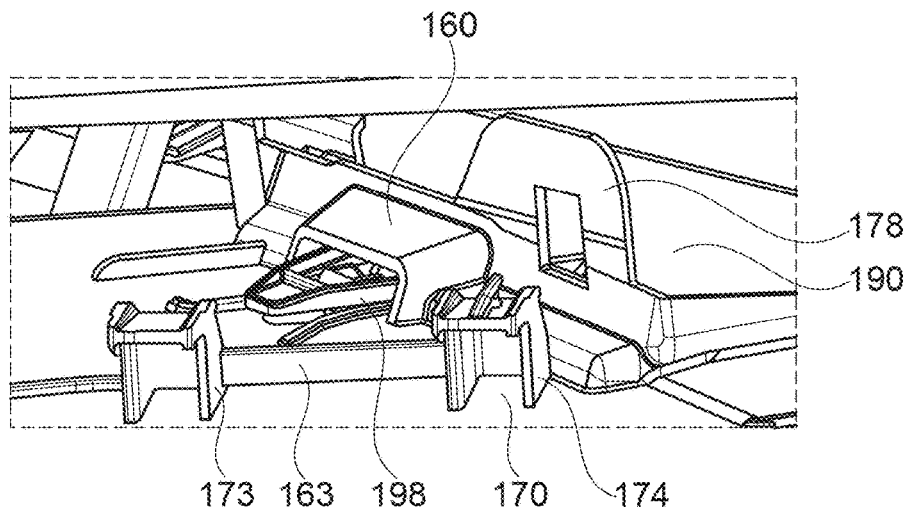

The bottom clip 198 of the upper base cover 190 goes into the pocket 160 in the lower base cover 170 and locates the bottom parts of the components 190 and 170, as shown in FIG. 10h.

Figure 10I:
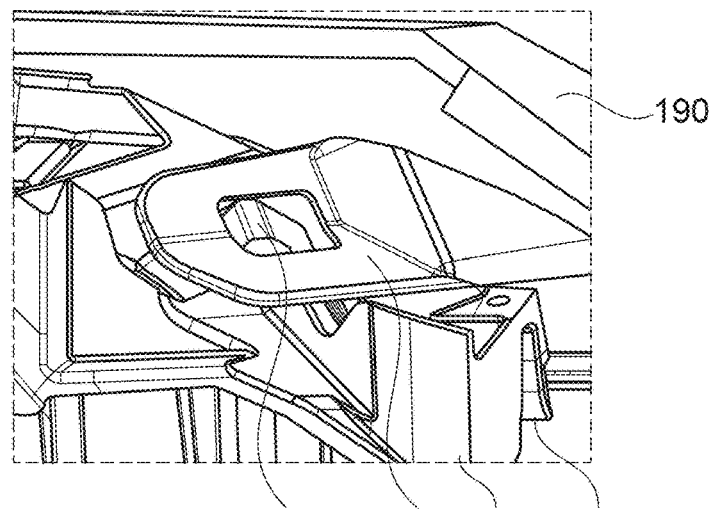

The last cover engagement feature is the hoop clip 199 of the upper base cover 190 which is shown in FIG. 10i and secures the whole assembly by engaging with the projection 866 of the door gasket substrate 804.

Accordingly, the sealing means 800 plays a central role due to in particular
- including integrated two way simultaneous sealing function with three sealing areas, i.e. the sealing area I providing an inner sealing to the base frame 110, the sealing area II providing an outer sealing to the lower base cover 170, and the sealing area II providing an outer sealing to the door panel 605;
- having a geometry which permits the case lower 220 of the head assembly to be assembled over the base frame 110,
- providing a datum area 850 with a T section support structure for the upper base cover 190 permitting simple clip together assembly,
- allowing a locking system, no screw assembly, of the lower base cover 170 rotating over the camera 700, and
- providing the channel 900 for the glass run seal 920 together with the base frame 110 and the retainer means 301, with said channel 900 allowing to position and locate the glass run seal 920, such that the exterior rear view device 1 holds the glass run seal 920 in a solid position and, thereby, provides a very pleasing overall appearance suggesting that the exterior rear view device 1 extends or rather grows out of the wait finisher 940 covering part of the glass run seal 920.

It will be appreciated by those skilled in the art that changes could be made to the embodiments described above without departing from the broad inventive concept thereof. It is understood, therefore, that the invention disclosed herein is not limited to the particular embodiments disclosed, and is intended to cover modifications within the spirit and scope of the present invention.

REFERENCE SIGNS 1 exterior rear view device
2 vehicle
100 base assembly
102 clip
103 clip
104 clip
105 clip
106 clip
107 clip
108 hook aperture
109 hook aperture
110 base frame
115 door attachment portion
116 arm
117 head attachment portion
118 hook aperture
120 location pin
121 T shaped location projection
124 opening for harness holder
125 location projection
126 location projection
127 location projection
135 step for sealing means clip
136 step for sealing means clip
137 opening for base frame clip
138 opening for sealing means clip
150 projection
151 slot
152 tab
153 projection
160 pocket
161 opening
162 opening
163 wall
164 opening
165 opening
170 lower base cover
171 multi-functional assembly projection
172 hook
173 hook
174 hook
175 clip
176 clip
177 clip
178 clip
179 clip
180 base cover cap
184 clip
185 clip
186 clip
190 upper base cover
192 location projection
193 location projection
194 location projection
195 location projection
198 clip
199 hoop clip
200 head assembly
210 actuator assembly
220 lower case
222 opening of lower case
301 retainer means
316 clip
320 holding portion
322 opening for location pin
350 hook
351 opening for arm of T shaped location projection
360 clip
391 T-slot
400 harness
410 camera harness
500 harness holder
510 fixing tie
520 clip
600 door
605 door panel
640 cheater panel
691 location peg
692 location peg
694 clip retention extension
695 clip retention extension
696 alignment projection
697 alignment projection
698 alignment projection
700 camera
702 opening 710 turn signal indicator
800 sealing means/2K door gasket
802 door gasket seal
804 door gasket substrate
810 clips
820 clip opening
830 clips
840 clips
850 datum area for upper case
851 T-slot
860 hook pocket
862 hook pocket
866 projection
870 rib
872 rib
881 screw opening
882 screw opening
900 channel
920 glass run seal
922 sealing lip
940 wait finisher
1000 window

The invention claimed is:

1. An exterior rear view device, comprising:
a base frame to be attached to a vehicle;
a head assembly for supporting at least one reflective element or camera;
a seal adapted to be installed between the base frame and a door panel of a door of the vehicle, the seal being an undivided component, the seal comprising a door gasket including a door gasket seal and a door gasket substrate for a two way simultaneous sealing comprising (i) a first sealing between the base frame and the door panel and (ii) a second sealing between the base frame and a base cover for the base frame;
a retainer coupled to the base frame, the retainer being a plastic unit for guiding a wire harness; and
a glass run seal positioned within a channel, the channel being at least partially defined by surfaces of the base frame, the seal, and the retainer.

2. The exterior rear view device of claim 1, wherein
the door gasket seal is formed from rubber and with an S shape cross-sectional geometry, and
the door gasket substrate is formed from plastic and with one or more clips, opening, hook pockets, location ribs, projections, screw openings or datum areas, and
the seal is formed in one cavity in a 2K tool.

3. The exterior rear view device of claim 2, wherein
the hook pockets provide location and positional control whilst assembling the seal to the base frame,
the hook pockets and the ribs are adapted to be assembled with a lower base cover,
the hook pockets and the ribs are adapted to lock and locate the seal in all three directions, and
the clips and opening are adapted to assemble with the base frame.

4. The exterior rear view device of claim 2, wherein
the clips and opening are adapted to assemble with the base frame, with the retainer being arranged therebetween, and
the screw openings are adapted for screws to secure the seal together with the retainer, to the base frame.

5. The exterior rear view device of claim 2, wherein
a datum area is adapted to locate an upper base cover and to provide the strength of the base frame to the base cover, and
a projection is adapted to secure the base cover by being engaged by a hoop clip of the upper base cover.

6. The exterior rear view device of claim 1, wherein the head assembly is attached to the base assembly in a moveable manner.

7. The exterior rear view device of claim 1, further comprising
the base cover of the base frame being formed as a metal unit, said base cover being made of plastic and comprising a lower base cover, a base cover cap and an upper base cover, and
a camera, attached to the base frame and viewing through an opening provided by the lower base cover.

8. A vehicle with a door having a door panel and supporting a window as well as a cheater panel sealed by a glass run seal, wherein the door panel also supports the exterior rear view device of claim 1.

9. The exterior rear view device of claim 1, wherein the channel for positioning and locating the glass run seal, with a sealing lip of the glass run seal engages a cheater panel on one side and a base cover cap as well as an upper base cover on another side for sealing a gap between.

10. The exterior rear view device of claim 1, further comprising at least one of:
a cheater panel pushing the glass run seal into the channel provided by the base frame, the retainer and the seal,
a base cover cap and an upper base cover that are rotated in place,
a sealing lip of the glass run seal that is pushed against the cheater panel sealing a gap between the base cover cap and the upper base cover on one side and the cheater panel on another side.

11. The exterior rear view device of claim 1, wherein the door gasket seal has a substantially S-shaped cross-sectional geometry.

12. An exterior rear view device, comprising:
a base frame to be attached to a vehicle;
a head assembly for supporting at least one reflective element or camera;
a base cover that includes at least an upper base cover and a lower base cover; and
a seal between the base frame and a door panel of a door of the vehicle, the seal including a door gasket including a door gasket seal and a door gasket substrate, wherein the door gasket seal provides
a first sealing area for an inner sealing to the base frame,
a second sealing area for an outer sealing to the lower base cover, and
a third sealing area for an outer sealing to the door panel.

13. A method for attaching the exterior rear view device of claim 12 to a vehicle, comprising:
attaching the door gasket to the base frame on one side and to the door panel on another side by a snap, clips, latch or screw connection, and
engaging the door gasket seal with an edge of the lower base cover and rotating the lower base cover on the base frame until one or more hooks of the lower base cover engage complementary hook pockets or ribs of the door gasket substrate.

14. The method of claim 13, wherein prior to attaching the door gasket to the base frame,
a retainer is attached to the base frame by a snap, clips or latch connection, after attaching a harness to the retainer, and
a lower case is attached to the head assembly by passing the base frame with the retainer, together with the harness, through an opening of the lower case.

15. The method of claim 14, wherein attaching the base frame with the retainer and the door gasket to the door panel comprises a 3rd hand clip/hanger function, making usage of
- a hook of the base frame adapted to hold the base frame with at least a part of the head assembly in Y direction to assist a screw assembly, and
- a clip of the base frame being arranged on secondary location keyway to highlight when the exterior rear view device is in its final assembly Z position.

16. The method of claim 13, wherein
- a base cover cap slides along a ramp on the lower base cover which locks in behind the base cover cap and creates a rotation point to rotate the base cover cap into its final position,
- the lower base cover and the base cover cap are connected by snap, clips or latch connection, without screws, and
- the assembly of the lower base cover and the base cover cap is secured by engaging the seal.

17. The method of claim 16, wherein at least one of
- a tab of the base cover cap is entered into an opening of the lower base cover for defining the attachment direction and locks in behind the base cover cap for creating said rotation point, the base cover cap is rotated into its final position, with the base cover cap being forced to flex outboard while rotating,
- a peg type projection of the base cover cap enters into a first slot in a multi-functional assembly projection of the lower base cover and another peg type projection of the base cover cap enters into another slot in the multi-functional assembly projection of the lower base cover as well as flexes back into a further opening of the lower base cover for controlling the final fit of the base cover cap,
- at least one alignment features are provided by the upper base cover, in form of projection, and lead two clip retention features, in form of the clip retention extensions, of the upper base cover onto corresponding clips of the base cover cap,
- a bottom clip of the upper base cover goes into a pocket in the lower base cover and locates the bottom parts of the upper base cover and the lower base cover,
- a hoop clip of the upper base cover engages with a projection of the door gasket substrate.

* * * * *